(12) United States Patent
Taylor

(10) Patent No.: US 7,947,110 B2
(45) Date of Patent: May 24, 2011

(54) METHODS FOR OPERATING A FILTRATION SYSTEM

(75) Inventor: Robert W. Taylor, Ponte Vedra Beach, FL (US)

(73) Assignee: General Electric Company, Schenectady, NY (US)

( * ) Notice: Subject to any disclaimer, the term of this patent is extended or adjusted under 35 U.S.C. 154(b) by 478 days.

(21) Appl. No.: 12/183,096

(22) Filed: Jul. 31, 2008

(65) Prior Publication Data

US 2010/0024639 A1    Feb. 4, 2010

(51) Int. Cl.
   *B03C 3/74*    (2006.01)
(52) U.S. Cl. .................. 95/2; 95/3; 95/6; 95/58; 95/61; 95/68; 95/70; 95/74; 95/76; 95/78; 96/25; 96/26; 96/30; 96/31; 702/176; 705/418
(58) Field of Classification Search ............ 95/2, 3, 95/6, 58, 61, 68, 70, 74, 76, 78; 96/18, 19, 96/21, 22, 25, 26, 30, 31; 702/176; 705/412, 705/413, 418, 500
See application file for complete search history.

(56) References Cited

U.S. PATENT DOCUMENTS

| | | | | |
|---|---|---|---|---|
| 3,893,828 | A * | 7/1975 | Archer | 96/19 |
| 4,811,197 | A * | 3/1989 | Wexler | 700/47 |
| 5,505,766 | A * | 4/1996 | Chang | 95/134 |
| 5,591,249 | A * | 1/1997 | Hankins | 95/6 |
| 5,938,818 | A * | 8/1999 | Miller | 95/63 |
| 6,623,544 | B1 * | 9/2003 | Kaura | 95/3 |
| 6,660,061 | B2 * | 12/2003 | Josephson et al. | 95/2 |
| 7,300,493 | B2 * | 11/2007 | Kim et al. | 95/2 |
| 7,341,616 | B2 * | 3/2008 | Taylor et al. | 95/70 |
| 7,488,375 | B1 * | 2/2009 | Chen | 96/25 |
| 7,569,100 | B2 * | 8/2009 | Tanaka et al. | 96/18 |
| 7,815,714 | B2 * | 10/2010 | Taylor et al. | 95/67 |
| 2006/0174768 | A1 * | 8/2006 | Taylor et al. | 96/59 |
| 2008/0034963 | A1 * | 2/2008 | Kiern et al. | 95/6 |
| 2009/0158926 | A1 * | 6/2009 | Taylor et al. | 95/70 |

FOREIGN PATENT DOCUMENTS

JP    3-270745 A    * 12/1991 ................ 96/26

* cited by examiner

*Primary Examiner* — Richard L Chiesa
(74) *Attorney, Agent, or Firm* — Mark E. Henderson; Ernest G. Cusick; Frank A. Landgraff

(57) ABSTRACT

A method of operating a filtration system that filters flue gas, which includes particulate matter and a gaseous pollutant. The filtration system may include a fabric filter, which is cleaned with periodic pulse cleanings, a discharge electrode upstream of the fabric filter, which imparts an electric charge to at least some of the particulate matter before the particulate matter collects on the fabric filter, a sorbent, which is injected into the flue gas upstream of the fabric filter and absorbs at least some of the gaseous pollutant, and a fan, which draws the flue gas through the fabric filter. The filtration system may have a pulse cleaning interval setting that may be manipulated by an operator of the filtration system. The pulse cleaning interval setting may be the time between the pulse cleanings. The method may include the steps of: determining a cost of operating the filtration system at a first pulse cleaning interval setting; determining a cost of operating the filtration system at a second pulse cleaning interval setting; and comparing the cost of operating the filtration system at the first pulse cleaning interval setting with the cost of operating the filtration system at the second pulse cleaning interval.

32 Claims, 9 Drawing Sheets

METHODS FOR OPERATING A FILTRATION SYSTEM

BACKGROUND OF THE INVENTION

The present invention relates generally to filtration systems and methods for removing particulate matter and/or gaseous pollutants from a stream of gas or other fluid. More specifically, but not by way of limitation, the present invention relates to a more cost effective and/or efficient filtration system and method that reduces the use of sorbents and take advantage of other economic benefits.

Fabric filtration is a common technique for separating out particulate matter in a gas stream. In an industrial setting, fabric filtration is often accomplished in a device known as a baghouse. Generally, a baghouse includes a housing that has an inlet for receiving dirty, particulate-laden gas and an outlet through which clean gas leaves the baghouse. The interior of the housing is divided by a tube sheet into a dirty gas or upstream plenum and a clean gas or downstream plenum, with the dirty gas plenum in fluid communication with the inlet and the clean gas plenum in fluid communication with the outlet. The tube sheet typically includes a number of apertures and supports a number of filter elements with each filter element covering one of the apertures. Generally, a filter element includes a support structure and a fabric filter media.

In operation, particulate laden or dirty gas is conducted into the baghouse, and more specifically into the dirty gas plenum, through the inlet. The gas then flows through the fabric filter media to the interior space within the filter cores. As the gas flows through the filter media, the particulate matter carried by the gas engages the exterior of the filter media and either accumulates on the filters or falls to the lower portion of the dirty gas plenum. Thereafter, the cleaned gas flows through the apertures in the tube sheet and into the clean gas plenum. The clean gas then flows out of the baghouse through the outlet.

As particulate matter accumulates or cakes on the filters, the flow rate of the gas is reduced and the pressure drop across the filters increases. To restore the desired flow rate, a reverse pressure pulse may be applied to the filters. The reverse pressure pulse expands the filter media and separates the particulate matter, which falls to the lower portion of the dirty gas plenum. While filter material technology has advanced sufficiently to allow a given filter element to be cleaned in this manner tens of thousands of times before replacement is needed, further extension of a filter's useful life is economically desirable. Extended filter life not only saves the cost of filters, it also saves the cost of filter replacement, which is often difficult, costly and requires the baghouse to be taken out of service for a period of time.

Another common technique for separating particulate matter from a gas stream is to use an electrostatic device, such as an electrostatic precipitator. In this device, particulate matter is electronically charged and then collected through the action of an electric field. A typical electrostatic device provides a discharge electrode that is maintained at a high voltage and a non-discharge electrode that is maintained at a relatively lower voltage or at ground. As the particulate-laden gas steam flows past the electrodes, the electric field present between the electrodes operates to charge a percentage of the passing particulate matter and causes them to collect on the non-discharge electrode. Further, when a discharge electrode is used in conjunction with a fabric filter, the charged particles create a dust layer that is less dense because the like-charges of the particles repel each other. With a less dense layer of particles, the period between pulse cleanings may be increased without incurring an increase in the pressure drop across the fabric filter.

Various sorbents may be injected into exhaust or flue gas for the purpose of adsorbing gaseous phase pollutants. The type of sorbent injected generally is a function of the pollutant to be removed. The injection rate of the sorbent generally is a function of the desired pollutant removal rate and the effectiveness of the sorbent. For example, powdered activated carbon (hereinafter "PAC") is a sorbent that may be injected into flue gas for the purpose of adsorbing the gaseous pollutant mercury. Typically, PAC is injected in quantities ranging from 0.5 to over 10 pounds per million actual cubic feet of flue gas treated. The cost of injecting enough PAC such that adequate exit levels of mercury are achieved per current regulatory standards can be a considerable one.

At present, given the potentially longer period between pulse cleanings, filtration systems generally do not take into account efficiencies that may be realized by manipulating sorbent injection rates, fabric filter cleaning cycles and other operational variables. That is, with the discharge electrode and the resulting longer periods between pulse cleanings, fabric filtration systems may be operated in a more cost effective method, saving cleaning cycles, prolonging filter bag life, and/or reducing the use of sorbents, as described in detail below.

BRIEF DESCRIPTION OF THE INVENTION

The present application thus describes a method of operating a filtration system that filters flue gas, which includes particulate matter and a gaseous pollutant. The filtration system may include a fabric filter, which is cleaned with periodic pulse cleanings, a discharge electrode upstream of the fabric filter, which imparts an electric charge to at least some of the particulate matter before the particulate matter collects on the fabric filter, a sorbent, which is injected into the flue gas upstream of the fabric filter and absorbs at least some of the gaseous pollutant, and a fan, which draws the flue gas through the fabric filter. The filtration system may have a pulse cleaning interval setting that may be manipulated by an operator of the filtration system. The pulse cleaning interval setting may be the time between the pulse cleanings. The method may include the steps of: determining a cost of operating the filtration system at a first pulse cleaning interval setting; determining a cost of operating the filtration system at a second pulse cleaning interval setting; and comparing the cost of operating the filtration system at the first pulse cleaning interval setting with the cost of operating the filtration system at the second pulse cleaning interval.

The present application further describes a method of operating a filtration system that filters flue gas. The flue gas may include particulate matter and a gaseous pollutant. The filtration system may include a fabric filter, which is cleaned with periodic pulse cleanings, a discharge electrode upstream of the fabric filter, which imparts an electric charge to at least some of the particulate matter before the particulate matter collects on the fabric filter, and a sorbent, which is injected into the flue gas upstream of the fabric filter and absorbs at least some of the gaseous pollutant. The filtration system may measure certain operating conditions during operation, including at least a gaseous pollutant emission level, which comprises the level of the gaseous pollutant in the emissions of the filtration system, and a pressure drop, which comprises the pressure drop across the fabric filter. The filtration system may have several operational settings that may be manipulated by an operator of the filtration system, including a current density setting, which comprises the current running through the discharge electrode divided by the total cloth area of the filter fabric, a pulse cleaning interval setting, which comprises the time between pulse cleanings, and a sorbent injection rate setting, which comprises the rate at which the sorbent is injected into the flue gas. The method may include the steps of:

a) increasing the current density setting from a first current density setting to an increased current density setting;

b) determining whether the increased current density setting causes a decrease in the pressure drop;

c) if it is determined that the increased current density setting causes a decrease in the pressure drop, repeating steps a and b until an increase to the current density setting does not cause a decrease in the pressure drop;

d) operating the filtration system at the last current density setting that caused a decrease in the pressure drop or, if none, the first current density setting;

e) increasing the pulse cleaning interval setting from a first pulse cleaning interval setting to an increased pulse cleaning interval setting;

f) determining whether the increased pulse cleaning interval setting causes a reduction to the gaseous pollutant emission level;

g) if it is determined that the increased pulse cleaning interval setting causes a decrease in the gaseous pollutant emission level, repeating steps e and f until an increase to the pulse cleaning interval setting does not cause a decrease in the gaseous pollutant emission level;

h) operating the filtration system at the last pulse cleaning interval setting that caused a decrease in the gaseous pollutant emission level or, if none, the first pulse cleaning interval setting;

i) decreasing the sorbent injection rate setting from a first sorbent injection rate setting to a decreased sorbent injection rate setting;

j) determining whether the decreased sorbent injection rate setting causes the gaseous pollutant emission level to exceed a predetermined maximum gaseous pollutant emission level;

k) if it is determined that the decreased sorbent injection rate setting does not cause the gaseous pollutant emission level to exceed a predetermined maximum gaseous pollutant emission level, repeating steps i and j until a decrease to the sorbent injection rate setting causes the gaseous pollutant emission level to exceed the predetermined maximum gaseous pollutant emission level; and l) operating the filtration system at the last sorbent injection rate setting that did not cause the gaseous pollutant emission level to exceed the predetermined maximum gaseous pollutant emission level or, if none, the first sorbent injection rate setting.

These and other features of the present application will become apparent upon review of the following detailed description of the preferred embodiments when taken in conjunction with the drawings and the appended claims.

DETAILED DESCRIPTION OF THE INVENTION

Figure 1:
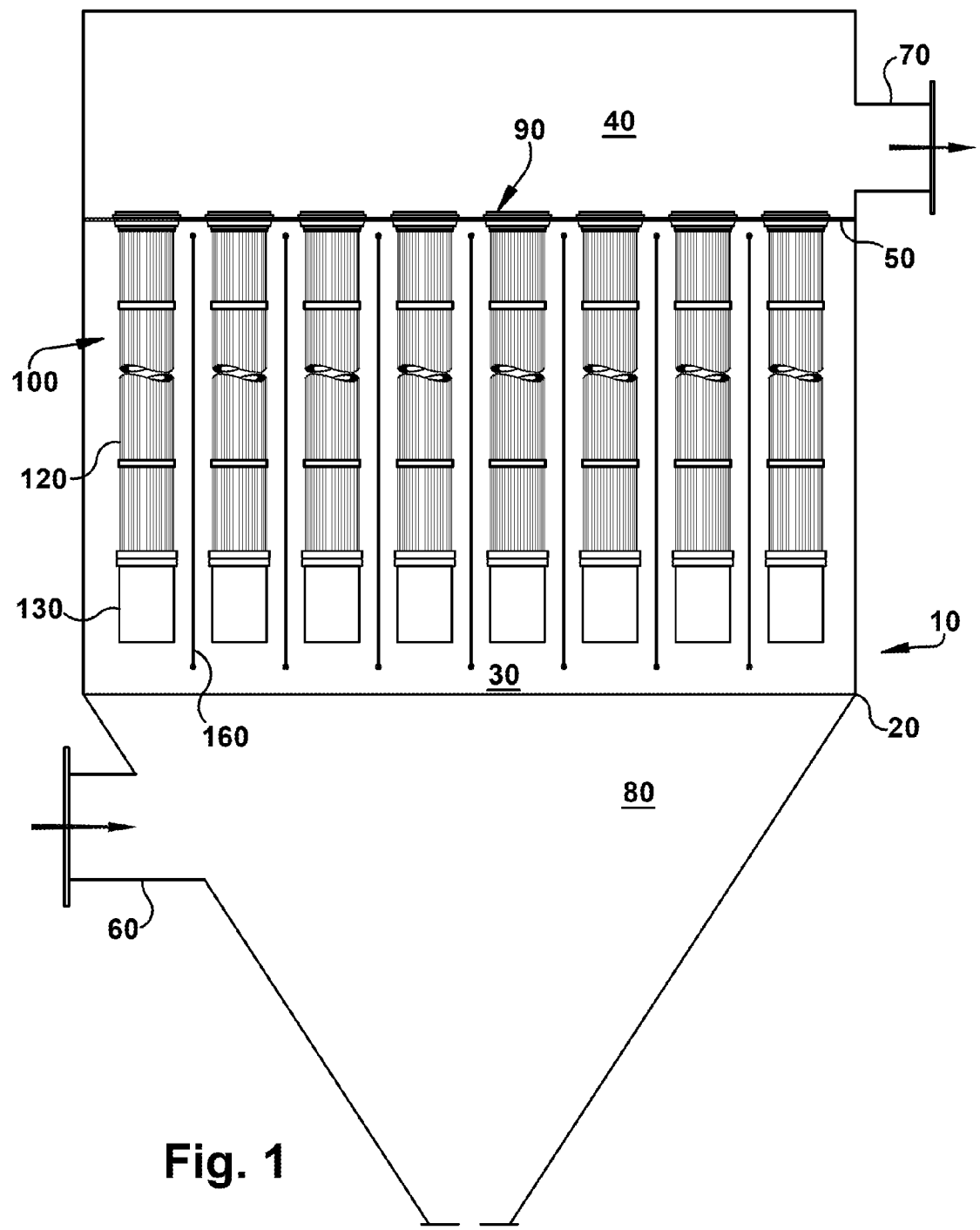
FIG. 1 is a schematic view, partly in section, of a filtration system in which exemplary embodiments of the present invention may operate.

Referring now to the figures, where the various numbers represent like parts throughout the several views, FIG. 1 is a schematic view, partly in section, of a filtration system in which exemplary embodiments of the present invention may operate. The filtration system 10 generally may include an enclosed housing 20 and a plurality of filter assemblies 100. Each filter assembly 100 may include a filter element 120 and a pre-collector body component 130 extending below and attached to the filter element 120. The system 10 also may include a pre-collector discharge electrode 160. Dirty gas may enter the housing 20 and clean gas may leave. More specifically, the dirty gas may pass adjacent to the pre-collector body components 130 and discharge electrodes 160, which may operate to remove at least a portion of the particulate matter in the dirty gas. Thereafter, the gas may pass through the filter elements 120 where additional particulate matter may be removed. Because of the operation of the pre-collector body components 130 and discharge electrodes 160, however, the filter elements 120 may have less particulate matter to remove and, therefore, the filter material of the filter elements will require fewer cleaning cycles for a longer useful service life.

The housing 20 may be divided into a first plenum 30 and a second plenum 40 by a tube sheet 50. A suitable material for both the housing 20 and the tube sheet 50 may be a metal plate. The housing 20 also may include an inlet 60 that is in fluid communication with the first plenum 30 and an outlet 70 that is in fluid communication with the second plenum 40. An accumulation chamber 80 may be located at the lower end of the first plenum 30 and may be defined by irregularly shaped and sloped walls. For example, the accumulation chamber 80 may have a V-shaped cross-section, as illustrated in FIG. 1.

At least a portion of the tube sheet 50 may be substantially planar. The tube sheet 50 may include a plurality of apertures, such as aperture 90, that extend through the planar portion of the sheet 50. FIG. 1 shows a number of filter assemblies 100 hanging from the tube sheet 50 and extending through the apertures 90 in the sheet 50. Each filter assembly 100 may be supported at its upper end by the tube sheet 50 and may hang downwardly in a substantially vertical direction. It should be understood that in operation, there may be a filter assembly 100 associated with each aperture 90 in the sheet 50. Also, the filter assemblies 100, as illustrated, do not extend into the accumulation chamber 80, but it should be apparent that filter assemblies could be made with a length that allowed them to extend into the accumulation chamber 80.

Each filter assembly 100 may include a filter element 120 and a pre-collector body component 130. The pre-collector body component 130 may be coupled to and supported by the lower end of the filter element 120. A pre-collector discharge electrode 160 may hang vertically between the filter assemblies 100.

It should be understood that the filter assemblies 100 may be arrayed in a vertically extending matrix in a typical housing 20 as is known in the baghouse industry. The discharge electrodes 160 may be positioned in a number of different locations within the typical baghouse. For example, as indicated in FIG. 1, the discharge electrodes 160 may be positioned in their own rows and columns between and aligned with the filter assemblies 100. Alternatively, the discharge electrodes 160 may be offset from those devices so that in effect, the discharge electrodes are positioned at the center of each square of four filter assemblies 100. It is also within the scope of this invention for the discharge electrodes 160 to be positioned between every other or every third filter assembly 100 or square of four filter assemblies 100. Of course, additional locations for the discharge electrodes 160 also are within the scope of this invention.

Figure 2:
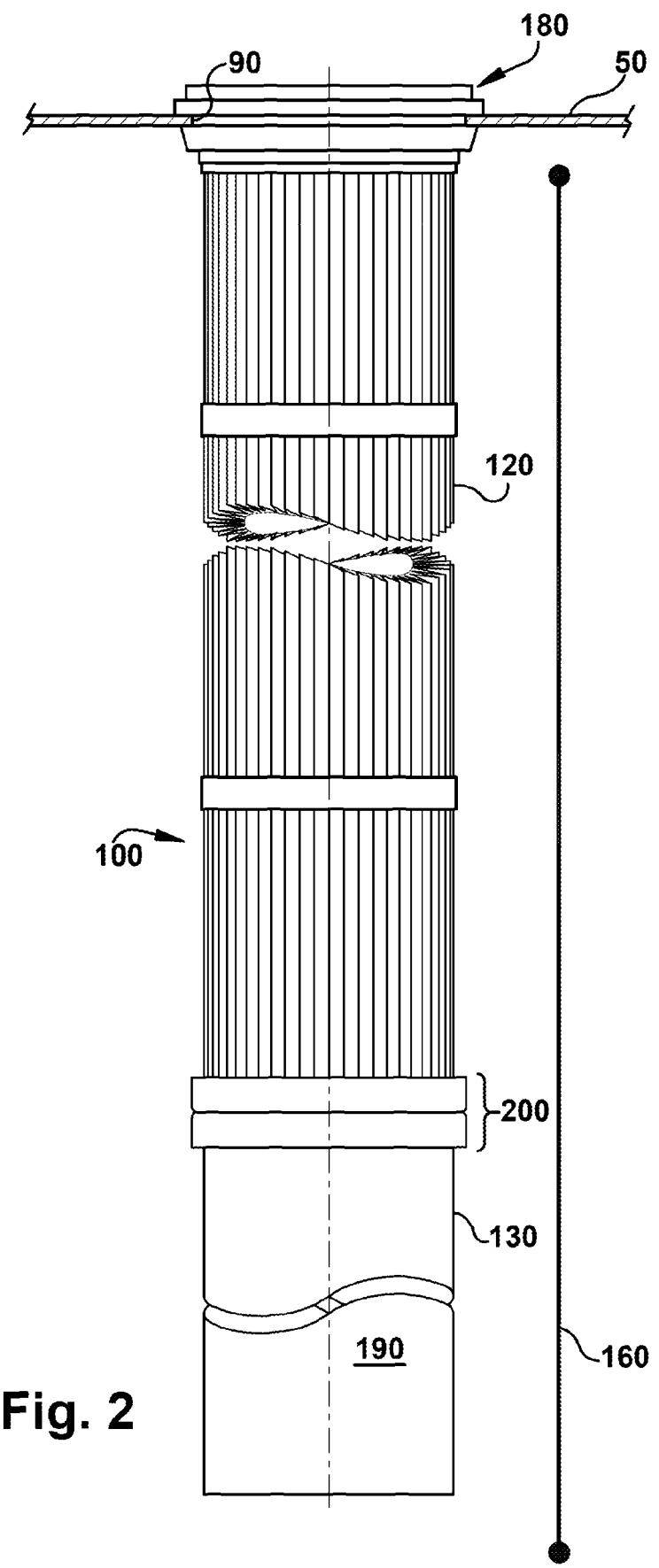
FIG. 2 is an elevation view of one embodiment of a filter assembly and pre-collector apparatus which may be used in conjunction with exemplary embodiments of the present invention.

As shown in FIG. 2, the filter assembly 100 may be coupled to the tube sheet 50 at an aperture 90 by a collar 180. Although the filter assembly 100 is shown having a circular cross section, it will be apparent that any suitable configuration cross-section could be used, such as, but not limited to, an oval or a rectangle. The pre-collector body component 130 may be coupled to the filter element 120 at a connection 200, so that the pre-collector body component 130 extends co-axially with the filter element 120 upstream from the filter element 120. The collar 180 and the connection 200 will be described below.

The filter element 120 preferably may include a pleated filter media. The pleated filter media may be formed in a substantially tubular shape with accordion folds at its inner and outer peripheries. The pleated filter media may be constructed of any suitable material for a desired filtering requirement.

The pre-collector body component 130 preferably may have a tubular shape. It should be understood that the pre-collector body component 130 is not limited to this shape and that other shapes are included within the scope of this invention, such as a rectangular or oval shape. The pre-collector body component 130 is made of any suitable electrically conductive material or, alternatively, may be coated by any suitable electrically conductive material. Preferably, the pre-collector body component 130 may be made substantially of metal such as conductive carbon steel. In this example, the outer surface or sidewall 190 of the pre-collector body component 130 may be substantially continuous, that is, it has no holes or perforations. As discussed in more detail below, the pre-collector body component 130 may have a convective cooling channel (not shown in FIG. 2) that runs along its interior surfaces. The convective cooling channel may include a conventional loop cooling circuit that loops down from the collar 180, through the filter assembly 100, through the connection 200, circulates through the pre-collector body component 130, and then returns to the collar 180. Coolant, such as air, water, or other coolant, may be circulated through the convective cooling channel to cool the surface of the pre-collector body component 130.

The discharge electrode 160 may extend vertically and may be spaced a short distance horizontally from the pre-collector body component 130. The discharge electrode 160 may be made from an electrically conductive material such as a thin wire of stainless steel. In operation, as will be discussed later, the discharge electrode 160 may be electrically coupled to a voltage source, so that it obtains and maintains an electric potential or charge relative to the pre-collector body component 130. In one example, the discharge electrode 160 is coupled to line voltage through a transformer and rectifier (not shown) so that the discharge electrode is maintained at a voltage potential between negative 20,000 and negative 50,000 volts DC. The discharge electrode 160 may be entirely or partially shielded (i.e. only that length that corresponds to the length of the pre-collector body component 130) to lessen the likelihood that electrical current will arc between the pre-collector body component 130 and the discharge electrode 160. Shielding is suggested if the discharge electrode 160 is to be placed in close physical proximity to the pre-collector body component 130 or if the electric potential or charge provided to the discharge electrode 160 and/or the pre-collector body component 130 is notably large relative to the distance between the pre-collector body component 130 and the discharge electrode 160.

Figure 3:
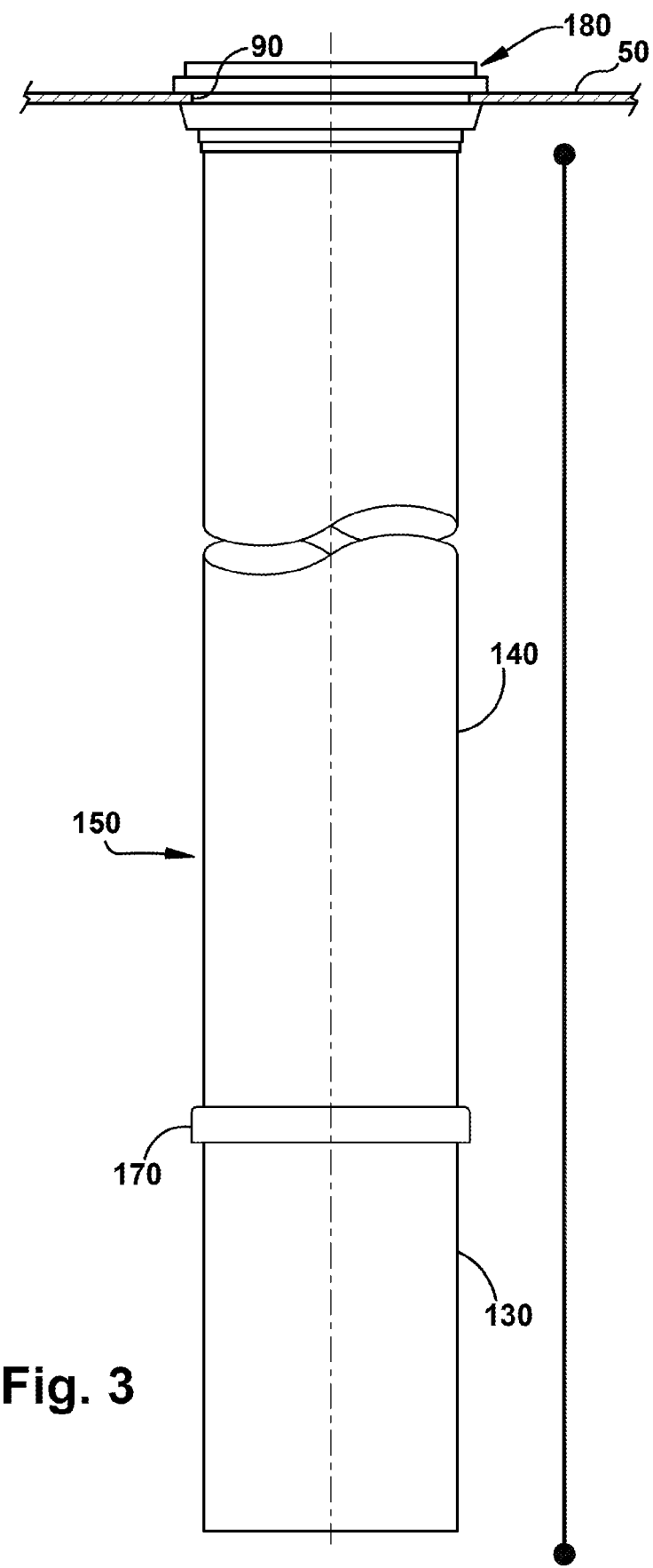
FIG. 3 is an elevation view of a second embodiment of a filter assembly and pre-collector apparatus which may be used in conjunction with exemplary embodiments of the present invention.

Another example of a filter assembly 150 coupled to the tube sheet 50 at an aperture 90 by a collar 180 is illustrated in FIG. 3. In this example, the filter assembly 150 may include a bag filter element 140 instead of a pleated filter element 120. The bag filter element 140 may be made from a flexible, pliable fabric. The fabric may be any suitable material for the desired filtering requirement. The pre-collector body component 130 may be coupled to the filter bag element 140 at a connection 170, so that the pre-collector body component 130 may extend co-axially with the filter bag element 140 upstream from the bag filter element. A convective cooling channel (not shown) may be provided as discussed above in relation to the example of FIG. 2.

Figure 4:
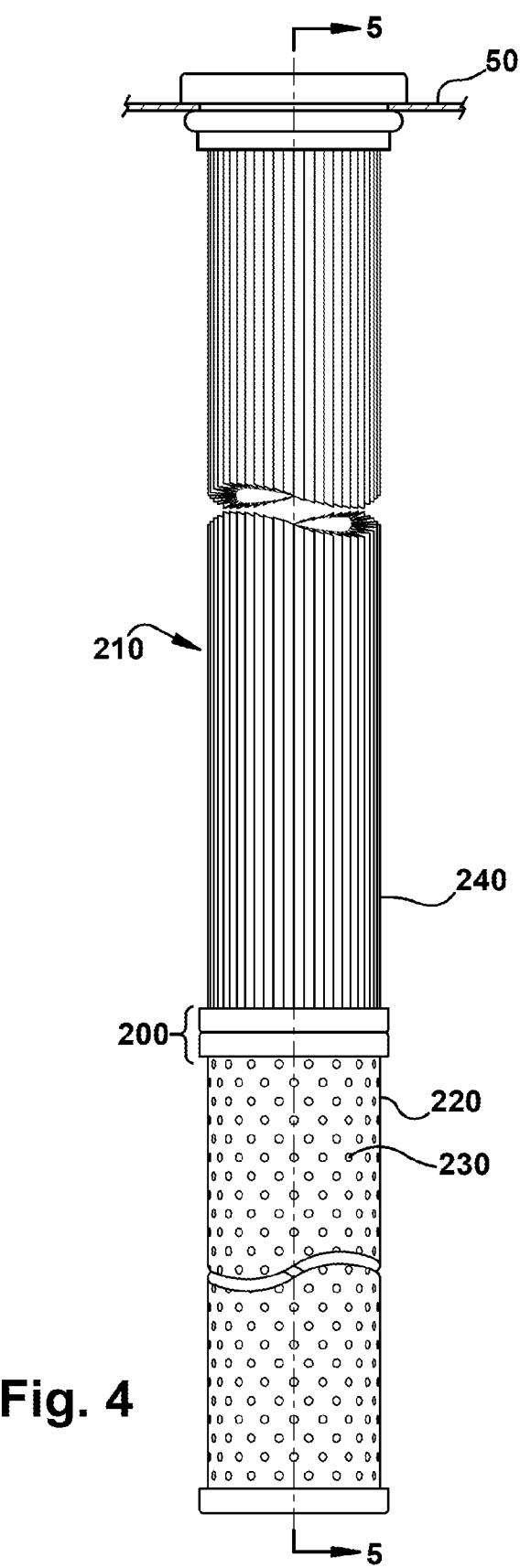
FIG. 4 is an elevation view of another embodiment of a filter assembly and pre-collection apparatus which may be used in conjunction with exemplary embodiments of the present invention.

A filter assembly 210 according to another example that includes a pre-collector body component 220 is illustrated in FIG. 4. In this example, filter assembly 210 also includes a pleated filter element 240. Also in this example, the pre-collector body component 220 is a hollow tube that has a plurality of apertures or perforations 230 extending therethrough. Preferably, the pre-collector body component 220 has approximately 30% to 60% of its surface area occupied by the apertures 230. The primary function of the apertures 230 is to reduce the weight of the pre-collector body component 220. As with the previous example, the pre-collector body component 220 may be made from or coated by any suitable electrically conductive material. One such suitable material that the pre-collector body component 220 could be made from is carbon steel. A convective cooling channel (not shown) may be provided as discussed above in relation to the example of FIG. 2.

Figure 5:
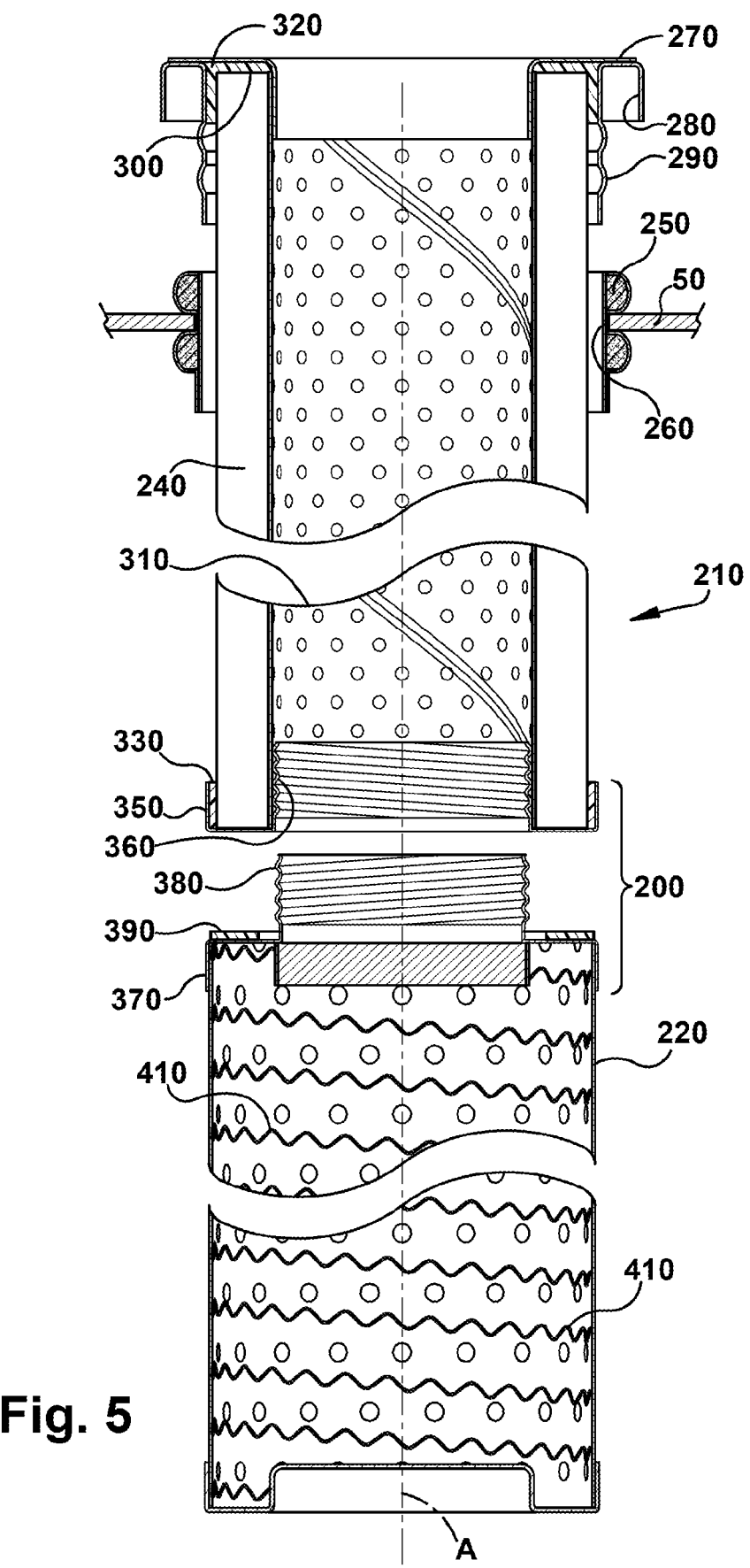
FIG. 5 is an exploded sectional view of the filter assembly and pre-collection apparatus illustrated in FIG. 4, taken approximately along the line 5-5 in FIG. 4.

The filter assembly 210 is illustrated in FIG. 5 as partially installed. The filter assembly 210 may extend through an aperture 260 in the tube sheet 50 and through a resilient mounting band 250. The band 250 may ensure that the filter assembly 210 may be used with apertures that have not been precisely cut. The band 250 may include resilient metal, such as a stainless steel, and may be covered with fabric. The band 250 may be constructed with an outer diameter substantially equal to the inner diameter of the aperture 260 and may be easily deformed and inserted into the aperture 260 so that the exterior surface of the band 250 will snugly engage the surface defining the aperture 260. The band 250 may provide a seal between the filter assembly 210 and the aperture 260 in the tube sheet 50.

Filter assembly 210 also may include a mounting sleeve 270 located at its upper end to attach the filter assembly 210 to the tube sheet 50. The mounting sleeve 270 may be made from a suitable material, such as stamped, drawn or otherwise formed metal. The mounting sleeve 270 may define an open end of the filter assembly 210 for fluid communication with the clean gas plenum 40. The mounting sleeve 270 may be shaped so as to include a channel 280 for receiving a part of the band 250 when the filter is moved into an operational position. The mounting sleeve 270 further may include a tubular portion 290 that is adapted to be located within and extend through the aperture 260 in the tube sheet 50 and through the band 250.

A core 310 may be fixed to and extends from the mounting sleeve 270. The core 310 may be made from a suitable material, such as perforated sheet metal, expanded metal, or mesh screen. A radially inner channel 300 in the mounting sleeve 270 may receive an upper end of the core 310. The upper end of the core 310 and the mounting sleeve 270 sleeve may be connected together in a suitable manner, such as by welds, rivets, fasteners, or metal deformation. Thus, a relatively strong connection and structure may exist that is capable of supporting the weight of the filter assembly 210 as it hangs from the tube sheet 50 even when the filter assembly has a relatively heavy accumulation of particles and the convective cooling channels are filled with liquid coolant. Additionally, the connection may establish electrical communication between the mounting sleeve 270 and the core 310 so that these structures will have the same electrical potential.

A pleated filter element 240 may be located concentrically around the core 310. The pleated filter element 240 may be formed in a substantially tubular shape about the perimeter of the core 310 with accordion folds at its inner and outer peripheries. The pleated element 240 may be constructed of any suitable material for a desired filtering requirement. The upper end of the pleated element 240 also may be located in the channel 300 of the mounting sleeve 270 and placed in a potting material 320, which may act to seal the pleated element and the mounting sleeve. The pleated element 240 may be located radially inward of the core 310.

The filter element 240 and the pre-collector body component 220 may be connected by a threaded connection 200. The threaded connection 200 may include a collar 350 located at the lower end (as viewed in FIG. 4) of the filter assembly 210. The collar 350 may have a receiving internally threaded portion 360. The collar 350 may be fixed to the core 310 and/or filter element 240 in a suitable manner such as by welds, rivets, fasteners or metal deformation and, as in this example, it may also be sealed to pleated filter element 24() by an potting material 330. The connection between the collar 350 and the core 310 may establish electrical communication between these two structures so that they have the same electrical potential.

The threaded connection 200 also may include a collar 370 located at the upper end of the pre-collector body component 220. The collar 370 may have an externally threaded tubular portion 380 for threaded engagement with the receiving portion 360. The collar 370 may be fixed to the pre-collector body component 220 in a suitable manner such as by welds, rivets, fasteners or metal deformation. Thus, electrical communication may be established between the collar 350, the collar 370 and the pre-collector body component 220 so that these structures have the same electronic potential.

A compressible gasket 390 may be located between a lower end surface of the collar 350 of the filter assembly 210 and an upper end surface of the collar 370 of the pre-collector body component 220. The gasket 390 may compress as the filter element 240) and the pre-collector body component 220 may be connected together when filter element 240 and the pre-collector body component 220 may be relatively rotated about a longitudinal central axis A to engage the threaded portions 360, 380 and thread the collar 370 into the collar 350. The connection device 200 may have a size capable of fitting through the effective size of the apertures 90 or 260 in the tube sheet 50 and a strength sufficient to support the operational weight of the pre-collector body component 220. Of course, it should be understood that other connection devices, such as a clamp or the like, may be employed in alternate examples to connect the filter assembly and pre-collector apparatus body component.

It should be understood that the sidewall of pre-collector body component 220 is electrically coupled to the tube sheet 50. This electrical connection is accomplished through a series of physical connections. First, the sidewall of body component 220 is in contact with the collar 370, which, in turn, is in contact with the collar 350 when the pre-collector body component 220 is installed on the filter assembly 210. The collar 350 is in physical contact with the core 310, and the core 310 is in physical contact with the mounting sleeve 270. Mounting sleeve 270, in turn, is in contact with the mounting band 25(), which is in contact with the tube sheet 50. Finally, the tube sheet 50 is in contact with the housing 20. Thus, the pre-collector body component 220 will have the same electric potential as the housing 20. As stated earlier, preferably, the pre-collector body component 220 is also grounded since the housing 20 is grounded.

The pre-collector body component 220 further may have one or more convective cooling channels 410. In some examples, the convective cooling channel 410 may run circumferential around the interior surface of the pre-collector body component 220. In some examples, as demonstrated in FIG. 5, the convective cooling channel 410 may wind in a serpentine fashion such that convective exchange between the convective cooling channels and the pre-collector body component 220 is maximized. The convective cooling channel 410 may weave through the plurality of perforations 230. The convective cooling channel 410 thusly may spiral down the pre-collector body component 220 and then return via a vertical track (not shown) along the interior surface of the pre-collector body component 220 to the top of the pre-collector body component 220 to complete the circuit.

Pursuant to conventional methods, the convective cooling channel may be supplied and drained by a supply channel (not shown) and a drain channel (not shown), which form the remainder of the cooling circuit. A first end of the convective cooling channel may connect to the supply channel. Pursuant to methods and systems known in the art, the supply channel may originate at a conventional coolant pump (not shown), travel into the second plenum 40, along the tube sheet 50, through the aperture 90, downward through the interior of the filter assembly 100, to the top of the pre-collector body component 220, where it may connect with the convective cooling channel 410 per conventional methods.

The drain channel (not shown) may connect to the second end of the convective cooling channel. Pursuant to conventional methods and systems known in the art, from this connection, the drain channel may travel upward through the interior of the filter assembly, through the aperture 90, along the tube sheet 50, out of the second plenum 40, to a heat exchanger (not shown). The heat exchange may be any known heat exchanger for use with whatever particular coolant is being used in the coolant circuit. For example, a conventional cross-flow convective heat exchange may be used. From the heat exchanger, the drain channel may connect to the coolant pump to complete the cooling circuit.

In operation, the discharge electrode 160 and pre-collector body component 220 (FIG. 3 or 4), 130 (FIG. 2) may have a difference in voltage potential. As stated earlier, in one example the discharge electrode 160 may be coupled to line voltage through a transformer and rectifier (not shown) so that the discharge electrode 160 is maintained at a voltage potential between negative 20,000 and negative 50,000 volts DC and the body component 220 (FIG. 3 or 4), 130 (FIG. 2) is grounded. It should be understood that the discharge electrode 160 could be provided with a positive electrical potential or that the voltages may be reversed. Of course, precautions such as insulation and shielding prevent electrical contact between the discharge electrodes 160 and the pre-collector body component 220 (FIG. 3 or 4), 130 (FIG. 2), the tube sheet 50, and/or the housing 20 may be used.

Particulate-laden gas may enter the first plenum 30 (FIG. 1) through the inlet 60. A fan (not shown) may be utilized to cause the gas to move through system 10. Once in the first plenum 30, the gas may pass adjacent to the pre-collector body components 130 and the discharge electrodes 160. As described, the pre-collector body components 130 and discharge electrodes 160 may be separately coupled to a power source or to ground so that an electrical potential difference exists between these components. This electrical potential difference may cause at least a portion of the particulate matter in the gas to collect on the pre-collector body components 130. More specifically, the discharge electrode 160 may emit negative ions such that airborne particles that come in proximity therewith become charged. The negatively charged particles then may be electrostaticly attracted to the grounded pre-collector body component 130 and collect thereon, giving away their charge to ground. No electrical field or potential is intentionally created across the filter element 120 of the filter assembly 100.

Thereafter, the gas may pass through the filter elements 120 (FIG. 2) and into the interior of the filter assemblies 100, which will cause the particulate matter carried by the gas (which will be less because of the pre-collection of particles by the pre-collector body component 130) to separate by the filter elements and either accumulate on or in the filter elements or separate from the gas and fall to the lower portion 80 of the first plenum 30. Next, the cleaned gas passes from the interior of the filter assemblies 100 through an aperture 90 in the tube sheet 50 and into the second plenum 40. Ultimately, the cleaned gas will exit the system 10 through the outlet 70.

As stated, the pre-collector body component 130 and discharge electrodes 160 may be separately coupled to a power source or to ground so that an electrical potential difference exists between these elements. In addition, incoming particles generally have a negative charge. Such particles will be repelled by the negatively charged discharge electrodes 160 and electrostaticly attracted to the ground charge of the pre-collector body components 130. Thus, preferably, the pre-collector discharge electrodes 160 may be electrically coupled to a large negative voltage and the pre-collector body component 130 may be electrically coupled to ground, which should tend to cause particles to collect on the pre-collector body components.

The pre-collector body component 130, after sufficient use, will become coated with particulate matter. This coating of particulate matter may make it difficult for the pre-collector body 130 to collect further airborne particulate matter. More specifically, the electrical resistivity of the particulate matter coat may act to effectively insulate the pre-collector body 130. Because of this, airborne particles will either fail to be attracted to the pre-collector body 130 or have to be charged to a preemptively high negative charge to overcome the voltage drop associated with the electrical resistivity of the particulate matter coat. Either result is undesirable. As one of ordinary skill in the art will appreciate, the electrical resistivity of the coating of particulate matter varies directly with temperature. That is, as the temperature of the coating of particulate matter increase, so does its electrical resistivity. Accordingly, if the coating of particulate matter is kept at a cooler temperature, additional negatively charged airborne particles may continue to be attracted to and attach themselves to the pre-collector body.

The cooling circuit (with the convective cooling channels 410) described above may be used to cool the pre-collector body 130, which in turn may cool the particulate matter collected thereon, thereby lowing it electrical resistivity and allowing the pre-collector body 130 to attract additional negatively charged airborne particles. The coolant pump (not shown) may circulate the coolant through the supply channel (not shown) to the convective coolant channel 410 within the pre-collector body 130. The interface between the convective coolant channel 410 and the pre-collector body 130 may be of a material, such as metal, that promotes heat exchange. The coolant then may circulate through the convective cooling channel 410 and cool the pre-collector body 130 by absorbing heat. Once through the convective cooling channel 410, the coolant may flow through the drain channel (not shown) to the heat exchanger (not shown). Note that in some examples, the coolant may not be recirculated. At the heat exchanger, the coolant may be cooled such that the heat absorbed in the convective cooling channel 410 is dissipated. The coolant then may flow to the coolant pump where the circuit begins anew.

In addition, conventional baghouse filtration systems require a diverse mix of particles sizes to exhibit acceptable pressure drop values across the filter elements. As the size distribution of incoming particles decreases in a conventional fabric filter, the system pressure drop will increase and pulse cleaning intervals will decrease. In other words, as the particle size becomes more uniform, the system pressure drop increases requiring more frequent cleaning. Fine dust tends to create a very compact dust layer on the surface of the filter elements, which drives up system pressure drop.

The electrically stimulated fabric filtration system of the present application overcomes this problem with the charging of the incoming particles. The relatively larger particles are more readily charged than the relatively smaller particles, and, therefore, these larger particles are more likely to attach to the pre-collector bodies 130, leaving smaller "like" charged particles to gather on the surface of the filter element. These "like" charged smaller particles tend to repel one another on the surface of the filter element, which creates a more porous dust layer. As a result, combining pre-cleaning of the particle burden with an electrically stimulated fabric filter of the present application reduces the pressure drop problem experience by conventional pulse jet filter systems, thereby reducing the frequency of pulse cleaning cycles, which, as one of ordinary skill in the art will appreciate, increases the useful life to the filter elements.

With the electrically stimulated fabric filtration system described above (with or without the use of the convective cooling channels) and the resulting reduction of pulse cleaning cycles, a more cost effective method or system of controlling the filtering process may be employed, as described in more detail below. As one of ordinary skill in the art will appreciate, various sorbents may be injected into flue gas for the purpose of adsorbing gaseous phase pollutants. The type of sorbent injected generally is a function of the pollutant to be removed. The injection rate of the sorbent is a function of the desired pollutant removal rate and the effectiveness of the sorbent.

For example, powdered activated carbon (hereinafter "PAC") is a sorbent that may be injected into flue gas or exhaust for the purpose of adsorbing the gaseous pollutant mercury. Typically, PAC is injected in quantities ranging from 0.5 to over 10 pounds per million actual cubic feet of flue gas treated. The cost of injecting enough PAC such that adequate exit levels of mercury are achieved per current regulatory standards can be a considerable one. That is, based on the relatively continuous operating mode of a power plant or other similar facility and the large gas volume treated, PAC costs can be a significant portion of total operating costs.

Generally, PAC injected into a gas stream adsorbs mercury then collects in the particulate removal device. When the particulate removal device is a fabric filter, the PAC generally resides on the surface of the filter bag until a cleaning cycle occurs. The PAC that remains on the surface of the filter bag between cleanings continues to interact with the flue gas moving through the fabric filter such that additional mercury is removed from the gas stream.

As one of ordinary skill in the art will appreciate, cleaning, or pulse cleaning, the fabric filter generally is accomplished by introducing blasts or pulses of compressed air at the clean gas outlet of the fabric filter bag. The flow of compressed air reverses flow through the filter bag causing the dust that had collected on the fabric filter (and the mercury contained therein) to drop into a hopper at the bottom of the bag house, where it then may be removed.

The frequency at which the fabric filter of a conventional bag house is cleaned is directly proportional to the rate at which the dust collects on the surface of the filter bags. Of course, as the dust layer accumulating on the dirty gas side of the filter bag increases, so does the pressure loss exhibited across the fabric filter. The pressure loss is the pressure differential between the dirty gas side of the filter bag and the clean side that is required to maintain a certain level of flow of flue gas. Flue gas is forced through an ever-increasing thickness of dust until the pressure loss reaches a pre-defined limit. Maintaining an adequate level of flow through this build-up of dust requires greater energy expenditures by the fans that draw the flue gas through the fabric filter. At the pre-defined pressure loss limit, the cleaning or pulsing process is initiated and continues until the system pressure loss reaches a lower limit. This cleaning cycle continues at a frequency between cleaning intervals established by the rate of rise of pressure loss in the system. The rate of rise of pressure loss is a function of the dust burden, particle size, and density of the dust layer.

As one of ordinary skill in the art will appreciate, a filtration system, such as filtration system 10 described above, that includes a pre-collector discharge electrode, such as the pre-collector discharge electrode 160, may reduce the frequency at which pulse cleanings are needed, i.e., increase the interval between cleanings. The pre-collector discharge electrode generally functions by introducing an electrical field into a conventional fabric filter. As discussed above in further detail, a negative charge emanates from discharge electrodes that are commingled among the filter bags. As a result, dust reaching the surface of the filter bag is generally negatively charged. The dust particles repel each other because of this "like" charge. The presence of the negative charge results in a dust layer that is not as tightly caked, i.e., a more porous medium through which the flue gas may flow. Thus, for the same dust burden and air to cloth ratio, the system pressure drop observed in a filtration system that includes discharge electrodes is about a ⅓ to a ¼ that of a conventional fabric filter house. Since an operational goal is to maintain total system pressure loss below a pre-set limit, the cleaning or pulsing interval can be greatly extended in a fabric filtration system that includes discharge electrodes as compared to a conventional bag house.

During field testing in which the inlet and outlet levels of a gaseous pollutant commonly found in flue gas, which in this case was mercury, in a fabric filtration system with a constant injection rate of a sorbent, in this case PAC, were measured, it was observed that the outlet level of the pollutant continued to decrease from a point after the pulse cleaning occurred. That is, when the filtration system pulsed, the outlet mercury levels immediately increased for a period and then, once a build-up of dust particles formed on the fabric filter, began the downward saw tooth pattern. What this indicates is that by allowing the sorbent to reside on the surface of the filter bag for longer periods of time, increased mercury removal may be achieved without increasing the amount of sorbent.

As one of ordinary skill in the art will appreciate, there a several variable operational costs that are incurred when running a filtration system. The cost of fan horsepower necessary to overcome pressure loss across the fabric filter is, often, a significant one. A significant variable affecting filter house pressure drop is the pulse cleaning interval. Higher system pressure loss results in increased power consumption by the fan. Another variable operating expense is the cost of the fabric filter bags. Generally, as one of ordinary skill in the art will appreciate, bag life is directly related to the frequency of pulse cleanings. That is, frequent pulse cleanings shorten filter bag life, whereas longer intervals between cleaning cycles extends the life of the bags.

The cost of sorbent required to achieve a specified level of gaseous pollutant reduction may also be a significant operational cost. In general, for example, increasing sorbent injection rates results in reduced gaseous pollutant emission levels. Further, operators of filtration systems often sell the filtered fly ash that collects on the fabric filter to cement manufacturers for use as a raw material in the cement manufacturing process. The presence of certain amounts of sorbents, such as PAC, in fly ash can preclude the sale of fly ash as an additive in the cement production process. In addition, many regions restrict landfill waste containing carbon above a specified level, which, if too much PAC is used (which has a high level of carbon), can preclude the convenient and inexpensive disposal of some fly ash in landfills. As a result, to continue the example of the removal of mercury with the sorbent PAC, reducing the amount of PAC used to maintain acceptable levels of mercury can provide an economic benefit to the user.

A fabric filtration system that includes a pre-collector discharge electrode generally allows the bag house to operate for extended periods of time without pulse cleanings. This introduces the ability to vary the amount of time dust resides on the surface of the filter bag over a wider range compared to a conventional approach. That is, for example, the cleaning interval can be defined with consideration of the system pressure drop and the amount of time sorbent has been on the surface of the filter bag. Algorithms, control programs, logic flow diagrams, and/or software programs, as described in detail below, may be developed that allow the operator of the plant to take advantage of this additional control input.

In general, the control or software program according to certain embodiments of the present application may have warning levels established to ensure that operation of the system meets the plant operator's objectives on a continuous basis. One warning level, for example, may relate to a maximum pressure drop through the baghouse allowable for the system. When the system pressure drop reaches that upper limit, a pulse cleaning would occur and override any optimized control input. Like wise, the control program may be programmed with a maximum outlet mercury emission level. If the maximum emission level is approached, the sorbent injection rate may be increased to a maximum pre-determined level or baseline level. However, when the system is operating within the predetermined emission levels and pressure drop limits, the control program, for example, may compare the cost of sorbent against the cost of energy related to additional fan horsepower consumed when higher pressure drops are experienced across the fabric filter in the baghouse. The control program then may make a choice based on economics as to whether changing the injection rate of the sorbent or the pulse cleaning interval is more cost effective. Relative time based costs for sorbent and fan horsepower may drive that decision, as well as other factors discussed in more detail below.

In the case of mercury, emission levels, for example, may be acquired from conventional continuous emission monitor (CEM) data. As discussed in more detail below, it is likely that pressure drop would be established as the first priority variable. A target baseline pressure drop would establish a cleaning interval. As the mercury emission levels change, for example, sorbent injection rates may be adjusted. The system then may attempt to achieve compliance with mercury emission limits with a reduced amount of sorbent. Ideally, the control program or operating system of the plant would operate the filtration system at the lowest pressure loss and sorbent injection rate that provides sufficient mercury adsorption levels. Note that many of the examples provided in the above paragraphs (and in the paragraphs to follow) discuss emission levels of mercury and the absorption of mercury with the sorbent PAC. This is exemplary only. One of ordinary skill in the art will appreciate that the invention disclosed herein would also apply to any other gaseous pollutant/sorbent pairing for example, sulfuric acid gas and the sorbent lime trona, or sodium bicarbonate and sorbent magnesium oxide.

Figure 6:
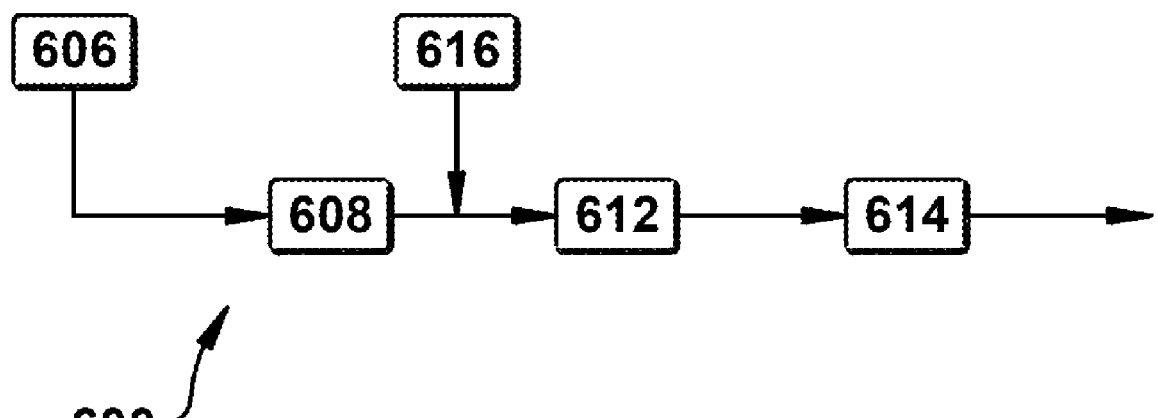
FIG. 6 is a flow diagram of a filtration system in which exemplary embodiments of the present application may be used.

FIG. 6 is a schematic plan of an exemplary filtration system 600 in which an embodiment of the present application may be used. As illustrated, fuel 606 may be delivered to a boiler 608 where it is combusted. The energy created by the combustion, for example, may be used to generate steam in a steam turbine that generates electricity (not shown). After the boiler 608, the flue gas or exhaust from the combustion may move through a baghouse filter 612 that, as described in detail above, includes a pre-collector discharge electrode. The flue gas may include particulate matter and gaseous pollutants. The baghouse filter 612 may filter the particulate matter from the flue gas with fabric filters. After the baghouse filter 612, the flue gas may flow through a fan 614, which operates to pull the flue gas through the system 600 to an exit, where the filtered flue gas may leave the filtration system 600. Between the boiler 608 and the baghouse filter 612, sorbent 616, such as PAC, may be injected into the flue gas to remove certain gaseous pollutants, such as mercury.

As one of ordinary skill in the art will appreciate, the filtration system 600 may include multiple sensors, actuators, valves, mechanical systems, etc. (not shown) that manipulate and control the many operation variables in the system. These hardware devices and systems may send data and information to and be controlled and manipulated by a conventional operating system (not shown). That is, the operating system may acquire data from the system, process the data, and control the various mechanical devices of the system pursuant to a set of instructions or logic flow diagram, which may be made part of a software program.

Figure 7:
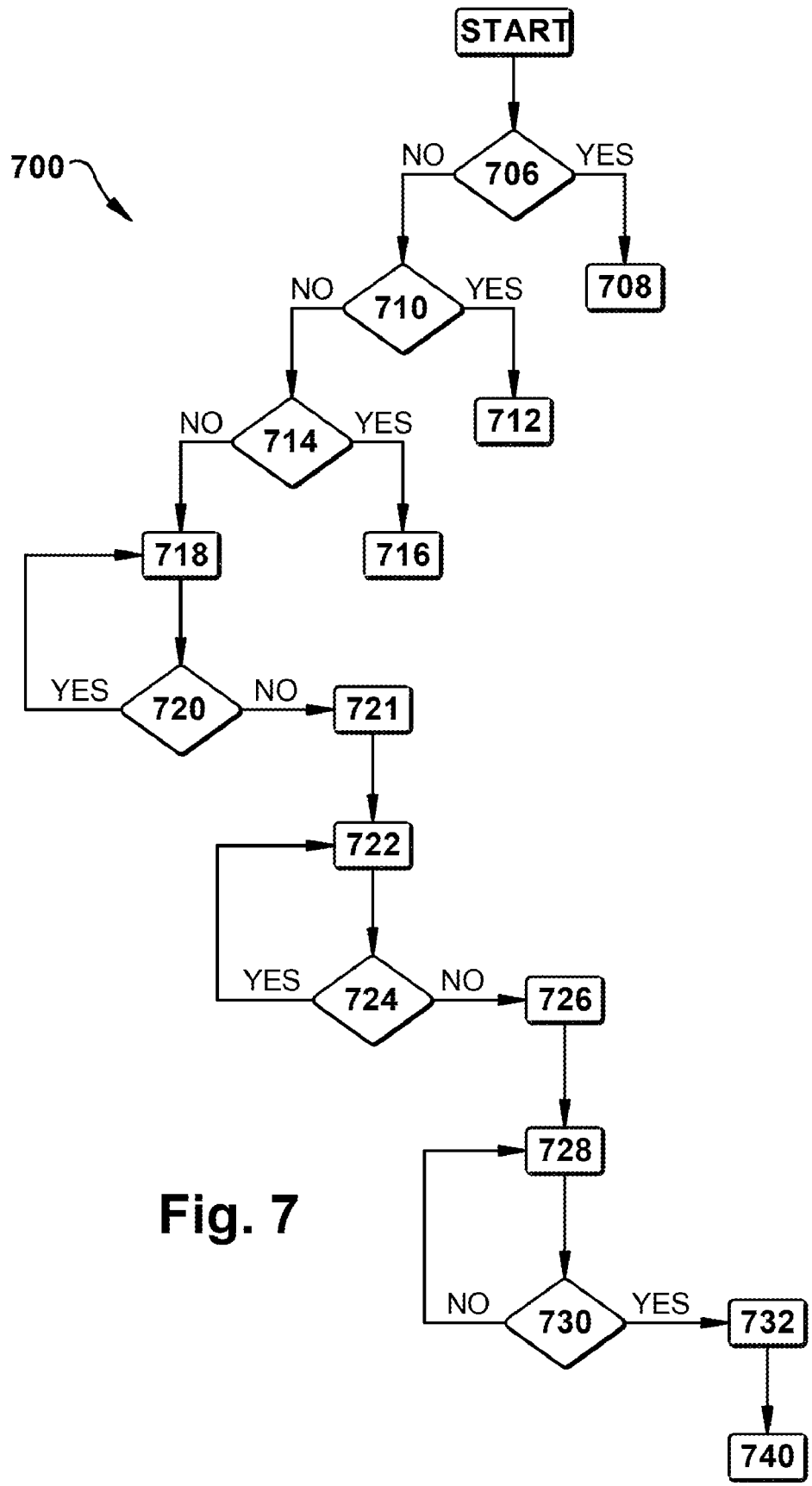
FIG. 7 is a flow diagram illustrating a method according to an exempla y embodiment of the present application.

FIG. 7 illustrates a logic flow diagram 700, which may be used in a software program to control the filtration system 600, according to an exemplary embodiment of the present application. As one of ordinary skill in the art will appreciate, the logic flow diagram 700 may be implemented and performed by the operating system. In some embodiments, the operating system may comprise any appropriate high-powered solid-state switching device. The operating system may be a computer; however, this is merely exemplary of an appropriate high-powered control system, which is within the scope of the application. For example, but not by way of limitation, the operating system may include at least one of a silicon controlled rectifier (SCR), a thyristor, MOS-controlled thyristor (MCT) and an insulated gate bipolar transistor. The operating system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the operating system also may be implemented using a variety of separate dedicated or programmable integrated or other electronic circuits or devices, such as hardwired electronic or logic circuits including discrete element circuits or programmable logic devices, such as PLDs, PALs, PLAs or the like. The operating system also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagram 700 may be used as the operating system. A distributed processing architecture may be preferred for maximum data/signal processing capability and speed.

As part of the operation of logic flow diagram 700, certain operation parameters may be established by the system operators. These parameters may include: 1) maximum pressure drop (representing the maximum pressure drop allowed across the fabric filters); 2) maximum particulate matter emission level (representing the maximum level of particulate matter allowed in discharged flue gas); 3) maximum gaseous pollutant emission level (representing the maximum allowable discharge level of a gaseous pollutant, such as, for example, mercury; 4) sorbent cost (representing the cost of the sorbent); 5) baseline pulse cleaning interval (representing the interval between pulse cleanings—the "baseline" setting for this parameter generally being a conservative or shorter interval setting ); 6) baseline sorbent injection rate (representing the sorbent injection rate—the "baseline" setting for this parameter generally being a conservative or relatively high sorbent injection rate); and 7) baseline current density (representing the total current running through the discharge electrodes divided by the total cloth area of the fabric filter in the baghouse—the "baseline" setting for this parameter generally being a conservative or relatively low current density).

Also, certain data concerning operating conditions may be gathered and transmitted to the operating system as part of the operation of logic flow diagram 700. This information may be obtained through conventional means and methods, sensors and commercially available systems and apparatus, and may include: 1) pressure drop (representing the measured pressure drop measured across the fabric filter); 2) particulate matter emission level (representing the measured level of particulate matter in the discharged flue gas); and 3) gaseous pollutant emission level (representing the measured discharge level of a gaseous pollutant, such as, for example, mercury). The operating conditions data may be updated by the operating system continuously or periodically so that fresh data is available to the operating system as it performs logic flow diagram 900.

Further, the filtration system may have certain operational variables or settings that may be manipulated by a system operator or operator to modify how the system functions. These may include: 1) current density (representing the total current running through the discharge electrodes divided by the total cloth area of the filter fabric); 2) pulse cleaning interval (representing the time between pulse cleanings); and 3) sorbent injection rate (representing the injection rate of the sorbent).

Note that the logic flow diagram 700 is described to include a number of operational parameters, several types of operating conditions data, several operational settings, and several discrete steps. One of ordinary skill in the art will appreciate that not all of the operational parameters, types of operational conditions data, or the several discrete steps are necessary in certain embodiments of the present application. Their inclusion herein is exemplary only. Further, as stated above, the operational conditions data may be readily gathered and transmitted to the operating system pursuant to conventional means and methods. Also, as the logic flow diagram 700 will make clear, the filtration system 600 has several operational variables or settings that may be manipulated by system operators to modify the operation of the filtration system 600, which affects the economics of the system. These include: 1) the current density; 2) the pulse cleaning interval; and 3) the sorbent injection rate. These settings may be manipulated and the new settings implemented in the filtration system 600 per conventional means, methods and systems, as one of ordinary skill in the art will appreciate.

According to an exemplary embodiment of the present application, logic flow diagram 700, or the process, may operate as follows. Note that the filtration system 600 may initially be operating at baseline settings and the logic flow diagram 700 may be used to modify those settings such that the system operates in a more cost effective manner. At other times, the logic flow diagram 700 may be used to modify settings that were previously changed through the operation of logic flow diagram 700 or for other reasons. At step 706, the process may determine the following: does the particulate matter emission level exceed the maximum particulate matter emission level? If "yes", then the process may proceed to step 708 where an appropriate action may be taken, for example, an alarm may be sounded or an operator alerted. If "no", then the process may proceed to step 710.

At step 710, the process may determine the following: does the gaseous pollutant emission level exceed the maximum gaseous pollutant emission level? The gaseous pollutant may be, for example, mercury. If "yes", then the process may proceed to step 712 where an appropriate action may be taken, for example, the system may increase the sorbent injection rate or revert to the baseline sorbent injection rate. If "no", then the process may proceed to step 714.

At step 714, the process may determine the following: is the pressure drop above the maximum pressure drop? If "yes", then the process may proceed to step 716 where an appropriate action may be taken, for example, the system may decrease the pulse cleaning interval (i.e., make the pulse cleanings more frequent). If "no", then the process may proceed to step 718.

At step 718, the process may increase the current density. This may be done by applying more current across the pre-collector discharge electrodes in the baghouse filter 612. The process may then continue to step 720. At step 720, the process may determine the following: did the increased current density result in a decrease in pressure drop across the fabric filter? If "yes", then the process may return to 718, where it may iterate between steps 718 and 720 until the process yields a "no" response at step 720. With the "no" response, the process may proceed to a step 721. At step 721, the process may set the current density to the previous current density (i.e., the last current density setting that resulted in a pressure drop, or, if no pressure drop was recorded through the operation of steps 718 and 720, the current density setting before reaching step 718). The new current density (if the current density was in fact changed through steps 718, 720 and 721, may be referred to as the "modified current density."

At step 722, the process may increase the pulse cleaning interval (i.e., make the interval longer so that pulse cleanings occur less frequently), and proceed to step 724. At step 724, the process may determine the following: did the increase in the pulse cleaning interval reduce the gaseous pollutant emission level? If "yes", then the process may return to step 722, where it may iterate through steps 722 and 724 until step 724 yields a "no" response. With the "no" response, the process may proceed to step 726. At step 726, the process may set the pulse cleaning interval to the previous pulse cleaning interval (i.e., the last pulse cleaning interval setting that resulted in a reduction to the gaseous pollutant emission level, or, if no reduction to the gaseous pollutant emission level was recorded through the operation of steps 722 and 724, the pulse cleaning interval setting before reaching step 722). The new pulse cleaning interval (if the pulse cleaning interval was in fact changed through steps 722, 724, and 726) may be referred to as the "modified pulse cleaning interval."

From step 726, the process may proceed to step 728. At step 728 the process may decrease the sorbent injection rate. From 728, the process may proceed to 730. At step 730, the process may determine the following: did the decrease in the sorbent injection rate cause the gaseous pollutant emission level to increase such that it is larger than the maximum gaseous pollutant emission level? If step 730 yields a "no" response, then the process may iterate through steps 728 and steps 730 until step 730 yields a "yes" response. Once step 730 yields a "yes" response, the process may continue to step 732. At step 732, the process may set the sorbent injection rate to the previous sorbent injection rate (i.e., the last sorbent injection rate setting that did not result in the gaseous pollutant emission level exceeding the maximum gaseous pollutant emission level, or, if no sorbent injection rate satisfied this qualification through the operation of steps 728 and 730, the sorbent injection rate setting before reaching step 728). The new sorbent injection rate (if the sorbent injection rate was in fact changed via steps 728, 730, and 732) may be referred to as the "modified sorbent injection rate."

One of ordinary skill in the art will appreciate that manipulating operational variables such as the current density, the pulse cleaning interval, and/or the sorbent injection rate, as described in flow diagram 700, may affect the costs associated with operating the filtration system 600. For example, the current density setting may affect operating costs in at least two ways. First, an increase in current density will necessarily increase the power costs associated with operating the pre-collection discharge electrodes. Second, as already described, an increase in current density may result in a decrease in the pressure drop across the fabric filters. This pressure drop generally decreases the energy needed by the fan to pull a required volume of flue gas through the filtration system, which, of course, would lower the costs of operating the fan.

The setting that controls the pulse cleaning interval also may affect the operating cost of the filtration system 600 in at least two ways. First, as one of ordinary skill in the art will appreciate, longer intervals between pulse cleanings generally prolong the life of the fabric filter bags, which decreases bag replacement costs. By calculating the average bag life under different pulse cleaning interval periods, the savings associated with longer intervals between cleanings may be determined. Second, shorter intervals between cleanings generally mean the filter bags operate with less pressure drop across the fabric filter, which, as described above, allows the fan to use less energy.

Sorbent injection rate settings also may affect operating costs. First, an increase in the sorbent injection rate generally results in an increase in the amount of sorbent used, which, of course, increases the overall cost of the sorbent. Second, considering again the example of the mercury sorbent PAC, an increase in the sorbent injection rate may mean that the carbon content of the ash is so high that the ash can not be sold or disposed of in a cost-effective manner. Reducing sorbent usage, thus, may result in lower sorbent costs as well as savings in the disposal of the ash. As one of ordinary skill in the art will appreciate, all of these potential costs/savings may be calculated using conventional means and methods with data that is typically gathered and recorded at filtration systems, such as the ones described in this application.

Thus, at a step 740 a cost versus savings analysis of the operating variables and the effect their change had on the filtration system may be completed so that it may be determined whether the plant is operating in a cost-effective manner. That is, the process may perform a cost/savings analysis to determine if any modifications to the operating variables, which, as stated, may include a new setting for the current density, pulse cleaning interval, and/or sorbent injection rate, are cost-effective. In general, this cost/savings analysis will include a determination of how the following operating costs are affected: 1) the cost of the sorbent; 2) the replacement cost of the fabric filter bags; and 3) the power costs associated with the fan. Other costs may be analyzed also.

For example, the process of the flow diagram 700, via the operation of some or all of steps 706-732, may recommend that the current density be increased from a previous setting or the baseline parameter for current density, the pulse cleaning interval be made longer than a previous setting or the baseline parameter for pulse cleaning interval, and the rate of sorbent injection be decreased from a previous setting or the baseline parameter for sorbent injection. The additional costs associated with operating the filtration system in this manner generally will include the increased power cost associated with increasing the current density. Also, additional costs will include the increased power cost needed to operate the fan. That is, because of the longer pulse cleaning intervals, the average pressure drop across the fabric filter generally will be higher, which will require the fan to expend more energy drawing the flue gas through the system. The cost savings associated with operating the filtration system, according to this example, generally will include: 1) lower overall fabric filter bag replacement cost (i.e., less frequent pulse cleanings means longer bag life); and 2) reduced sorbent cost due to the reduced sorbent injection rate. Other cost considerations, as described above, also may be taken into account.

At step 740, the process may compare the costs and the savings and, based on the comparison, make a recommendation as to whether the new operating variables are cost-effective. Thus, for example, if the additional costs exceed the savings, the process may determine that the new operating variables, i.e., the current density, the pulse cleaning interval, and/or the sorbent injection rate, that were recommended through the operation of the steps 706-732, be rejected and that the settings be returned to baseline or previous values. If, on the other hand, the savings exceed the costs, the process, at step 740, may determine that the new operating variables be accepted and that the filtration system continues operating with the new settings. After step 740, the process may return to the beginning of the process, i.e., step 706, to cycle through logic flow diagram 700 again or at a predetermined time in the future.

Figure 8:
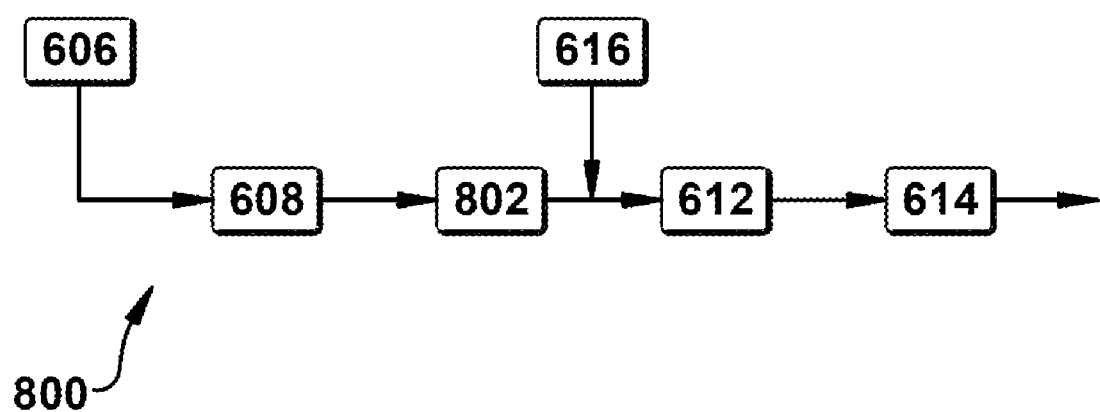
FIG. 8 is a flow diagram of a filtration system in which exemplary embodiments of the present application may be used.

FIG. 8 is a schematic plan of another exemplary filtration system 800 in which an embodiment of the present application may be used. Similar to the filtration system 600 discussed above and as illustrated, fuel 606 may be delivered to a boiler 608 where it is combusted. The energy created by the combustion, for example, may be used to generate steam in a steam turbine that generates electricity (not shown). After the boiler 608, the exhaust or flue gas from the combustion may move through an electrostatic precipitator ("ESP") 802. As described above, an electrostatic precipitator is a particulate collection device that removes particles from a flowing gas (such as air) using the force of an induced electrostatic charge instead of a fabric filter. The ESP 802 may remove a substantial amount of the particulate matter from the flue gas.

From the ESP 802, the flue gas may move through a baghouse filter 612 that, as described in detail above, includes a pre-collector discharge electrode. The flue gas may include particulate matter and gaseous pollutants. The baghouse filter 612 may filter much of the remaining particulate matter from the flue gas. After the baghouse filter 612, the flue gas may flow through a fan 614 that pulls the flue gas through the filtration system 600 to an exit, where the filtered flue gas is discharged from the filtration system 600. Between the boiler 608 and the baghouse filter 612, sorbent 616, such as PAC, may be injected into the flow of flue gas to remove certain gaseous pollutants, such as mercury.

As one of ordinary skill in the art will appreciate, the filtration system 800 may include multiple sensors, actuators, valves, mechanical systems, etc. (not shown) that manipulate and control the many operation variables in the system. These hardware devices and systems may send data and information to and be controlled and manipulated by a conventional operating system (not shown). That is, the operating system may acquire data from the filtration system, process the data, and control the various mechanical devices of the system pursuant to a set of instructions or logic flow diagram, which may be made part of a software program.

Figure 9:
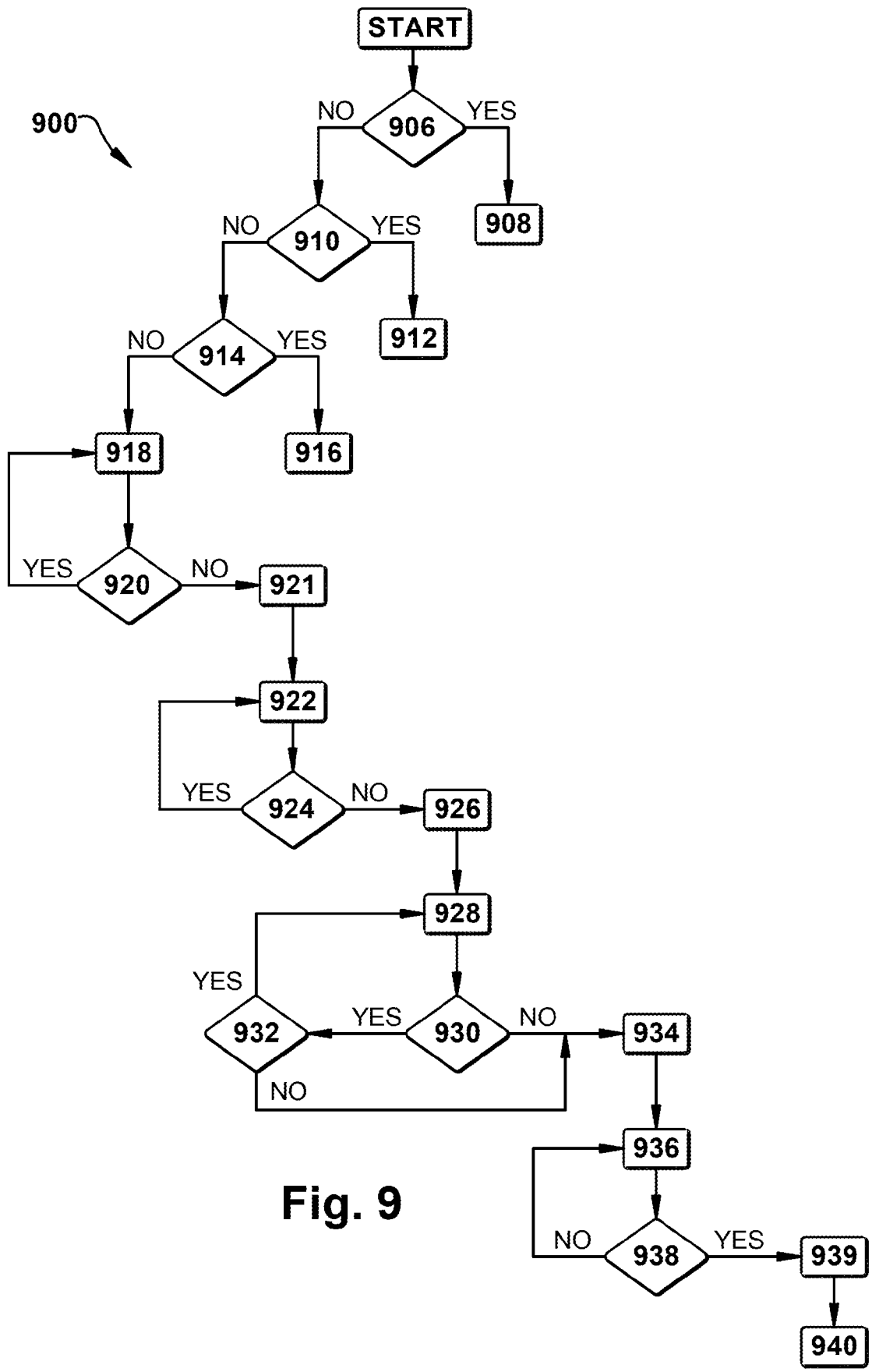
FIG. 9 is a flow diagram illustrating a method according to an alternative embodiment of the present application.

FIG. 9 illustrates a logic flow diagram 900, which may used in a software program to control the filtration system 800, according to an exemplary embodiment of the present application. As one of ordinary skill in the art will appreciate, similar to logic flow diagram 700, logic flow diagram 900 may be implemented and performed by the operating system. Further, as part of the operation of logic flow diagram 900, certain operation parameters may be established by the system operators. These parameters may include: 1) maximum pressure drop (representing the maximum pressure drop allowed across the fabric filters); 2) maximum particulate matter emission level (representing the maximum level of particulate matter allowed in the discharged flue gas or plant exhaust); 3) maximum gaseous pollutant emission level (representing the maximum allowable discharge level of a gaseous pollutant, such as, for example, mercury); 4) sorbent cost (representing the cost of the sorbent); 5) baseline pulse cleaning interval (representing the interval between pulse cleanings—the "baseline" setting for this parameter generally being a conservative or shorter interval setting); 6) baseline sorbent injection rate (representing the sorbent injection rate—the "baseline" setting for this parameter generally being a conservative or relatively high sorbent injection rate); 7) baseline current density (representing the total current running through the discharge electrodes divided by the total cloth area of the fabric filter in the baghouse—the "baseline" setting for this parameter generally being a conservative or relatively low current density); 8) baseline inlet particulate matter loading (representing the amount or level of particulate matter leaving the ESP 802 and entering the baghouse filter 612, the "baseline" setting for this parameter generally being a conservative or relatively low level of inlet particulate matter loading, i.e., a low amount of particulate matter leaving the ESP 802 and entering the baghouse filter 612); and 9) a maximum inlet particulate matter loading (representing a maximum allowable level of inlet particulate matter).

Also, certain data concerning operating conditions may be gathered and transmitted to the operating system as part of the operation of logic flow diagram 900. This information may be obtained through conventional means and methods, sensors and commercially available systems and apparatus, and may include: 1) pressure drop (representing the measured pressure drop measured across the fabric filter); 2) particulate matter emission level (representing the measured level of particulate matter in the discharged flue gas); and 3) gaseous pollutant emission level (representing the measured discharge level of a gaseous pollutant, such as, for example, mercury). The operating conditions data may be updated by the operating system continuously or periodically so that fresh data is available to the operating system as it performs logic flow diagram 900.

The filtration system may have certain operational settings that may be manipulated by a system operator or operator to modify how the system functions. These may include: 1) current density (representing the total current running through the discharge electrodes divided by the total cloth area of the filter fabric); 2) pulse cleaning interval (representing the time between pulse cleanings); 3) sorbent injection rate (representing the injection rate of the sorbent); and 4) inlet particulate matter loading (representing the amount of particulate matter that is allowed to leave the ESP 802 and continue downstream to the baghouse filter 612).

Note that the logic flow diagram 900 is described to include a number of operational parameters, several types of operating conditions data, and several discrete steps. One of ordinary skill in the art will appreciate that not all of the operational parameters, types of operational conditions data, or the several discrete steps are necessary in certain embodiments of the present application. Their inclusion is exemplary only. Further, as stated above, the operational conditions data may be gathered and transmitted to the operating system pursuant to conventional means and methods. Also, as the logic flow diagram 900 will make clear, the filtration system 800 has several operational variables or settings that may be manipulated by system operators to modify the operation of the filtration system 800 such that it may be more cost effective. These include: 1) the current density; 2) the pulse cleaning interval; 3) the sorbent injection rate; and 4) the inlet particulate matter loading. These settings may be manipulated and the new settings implemented in the filtration system 800 per conventional means, methods and systems as one of ordinary skill in the art will appreciate and as described below.

According to an exemplary embodiment of the present application, logic flow diagram 900 may operate as follows.

Note that the filtration system 800 may initially be operating at baseline settings and the logic flow diagram 900 may be used to modify those settings such that the system operates in a more cost effective manner. At other times, the logic flow diagram 900 may be used to modify settings that were previously changed from baseline settings through the operation of logic flow diagram 900 or other reasons. At step 906, the process may determine the following: does the particulate matter emission level exceed the maximum particulate matter emission level? If "yes", then the process may proceed to step 908 where an appropriate action may be taken, for example, an alarm may be sounded or an operator alerted. If "no", then the process may proceed to step 910.

At step 910, the process may determine the following: does the gaseous pollutant emission level exceed the maximum gaseous pollutant emission level? The gaseous pollutant may be, for example, mercury. If "yes", then the process may proceed to step 912 where an appropriate action may be taken, for example, the system may increase the sorbent injection rate or revert to the baseline sorbent injection rate. If "no", then the process may proceed to step 914.

At step 914, the process may determine the following: is the pressure drop above the maximum pressure drop? If "yes", then the process may proceed to step 916 where an appropriate action may be taken, for example, the system may decrease the pulse cleaning interval (i.e., make the pulse cleanings more frequent). If "no", then the process may proceed to step 918.

At step 918, the process may increase the current density. This may be done by applying more current across the pre-collector discharge electrodes in the baghouse filter 612. The process may then continue to step 920. At step 920, the process may determine the following: did the increased current density result in a decrease in pressure drop across the fabric filter? If "yes", then the process may return to 918, where it may iterate between steps 918 and 920 until the process yields a "no" response at step 920. With the "no" response, the process may proceed to a step 921. At step 921, the process may set the current density to the previous current density (i.e., the last current density setting that resulted in a pressure drop, or, if no pressure drop was recorded through the operation of steps 918 and 920, the current density level before reaching step 918). The new current density (if the current density was in fact changed through steps 918, 920 and 921, may be referred to as the "modified current density."

At step 922, the process may increase the pulse cleaning interval (i.e., make the interval longer so that pulse cleanings occur less frequently), and proceed to step 924. At step 924, the process may determine the following: did the increase in the pulse cleaning interval reduce the gaseous pollutant emission level? If "yes", then the process may return to step 922, where it may iterate through steps 922 and 924 until step 924 yields a "no" response. With the "no" response, the process may proceed to step 926. At step 926, the process may set the pulse cleaning interval to the previous pulse cleaning interval (i.e., the last pulse cleaning interval setting that resulted in a reduction to the gaseous pollutant emission level, or, if no reduction to the gaseous pollutant emission level was recorded through the operation of steps 922 and 924, the pulse cleaning interval before reaching step 922). The new pulse cleaning interval (if the pulse cleaning interval was in fact changed through steps 922, 924, and 926) may be referred to as the "modified pulse cleaning interval."

From step 926, the process may proceed to step 928. At step 928 the process may increase the inlet particulate matter level, i.e., increase the amount of particulate matter leaving the ESP 802 and entering the baghouse filter. This may be done, for example, by decreasing the power to the ESP 802. From 928, the process may proceed to 930. At step 930, the process may determine the following: did the increase to the inlet particulate matter loading cause a decrease to the gaseous pollutant emission level? If the process yields a "yes" at step 930, the process then may proceed to step 932 where the following determination may be made: is the inlet particulate matter loading below a maximum inlet particulate matter loading? If "yes", then the process may return to step 928, where the inlet particulate matter loading is again increased. Once either step 930 or 932 yields a "no" response, the process may continue to step 934. At step 934, the process may set the inlet particulate matter loading to the previous inlet particulate matter loading level (i.e., the last inlet particulate matter loading level that either: 1) did not result in reducing the gaseous pollutant emission level (as determined by step 930); or 2) did not exceed the maximum inlet particulate matter loading level (as determined by step 932), or, if no new inlet particulate matter loading level satisfied either of these criteria, the inlet particulate matter loading that was set before the process reached step 928). The new inlet particulate matter loading (if the inlet particulate matter loading level was in fact changed through the operation of steps 928, 930, 932, and 934) may be referred to as the "modified inlet particulate matter loading."

From step 934, the process may proceed to step 936. At step 936, the process may decrease the sorbent injection rate. From 936, the process may proceed to 938. At step 938, the process may determine the following: did the decrease in the sorbent injection rate cause the gaseous pollutant emission level to increase such that it is larger than the maximum gaseous pollutant emission level? If step 938 yields a "no" response, then the process may iterate through steps 936 and steps 938 until step 938 yields a "yes" response. Once step 938 yields a "yes" response, the process may continue to step 939. At step 939, the process may set the sorbent injection rate to the previous sorbent injection rate (i.e., the last sorbent injection rate setting that did not result in the gaseous pollutant emission level exceeding the maximum gaseous pollutant emission level, or, if no sorbent injection rate satisfied this criteria, the setting of the sorbent injection rate before the process reached step 936). The new sorbent injection rate (if the sorbent injection rate was in fact changed via steps 936, 938, and 939) may be referred to as the "modified sorbent injection rate."

One of ordinary skill in the art will appreciate that manipulating operational variables such as the current density, the pulse cleaning interval, the inlet particulate matter loading, and/or the sorbent injection rate, as described in flow diagram 900, may affect the costs associated with operating the filtration system 600. For example, the current density setting may affect operating costs in at least two ways. First, an increase in current density will necessarily increase the power costs associated with operating the pre-collection discharge electrodes. Second, as already described, an increase in current density may result in a decrease in the pressure drop across the fabric filters. This pressure drop generally decreases the energy needed by the fan to pull a required volume of flue gas through the filtration system, which, of course, would lower the costs of operating the fan.

The setting that controls the pulse cleaning interval also may affect the operating cost of the filtration system 600 in at least two ways. First, as one of ordinary skill in the art will appreciate, longer intervals between pulse cleanings generally prolong the life of the fabric filter bags, which decreases bag replacement costs. By calculating the average bag life under different pulse cleaning interval periods, the savings associated with longer intervals between cleanings may be determined. Second, shorter intervals between cleanings generally mean the filter bags operate with less pressure drop across the fabric filter, which, as described above, allows the fan to use less energy.

Sorbent injection rate setting also may affect operating costs. First, an increase in the sorbent injection rate generally results in an increase in the amount of sorbent used, which, of course, increases the overall cost of the sorbent. Second, considering again the example of the mercury sorbent PAC, an increase in the sorbent injection rate may mean that the carbon content of the ash is so high that the ash can not be sold or disposed of in a cost-effective manner. Reducing sorbent usage, thus, may result in lower sorbent costs as well as savings in the disposal of the ash. As one of ordinary skill in the art will appreciate, all of these potential costs/savings may be calculated using conventional means and methods with data that is typically gathered and recorded at filtration systems, such as the ones described in this application.

Thus, at a step 940 a cost versus savings analysis of the operating variables and the effect their change had on the filtration system may be completed so that it may be determined whether the plant is operating in a cost-effective manner. That is, the process may perform a cost/savings analysis to determine if any modifications to the operating variables, which, as stated, may include a new setting for the current density, pulse cleaning interval, and/or sorbent injection rate, are cost-effective. In general, this cost/savings analysis will include a determination of how the following operating costs are affected: 1) the cost of the sorbent; 2) the replacement cost of the fabric filter bags; and 3) the power costs associated with the fan. Other costs may be analyzed also.

For example, the process of the flow diagram 900, via the operation of some or all of steps 906-932, may recommend that the current density be increased from a previous setting or the baseline parameter for current density, the pulse cleaning interval be made longer than a previous setting or the baseline parameter for pulse cleaning interval, and the rate of sorbent injection be decreased from a previous setting or the baseline parameter for sorbent injection. The additional costs associated with operating the filtration system in this manner generally will include the increased power cost associated with increasing the current density. Also, additional costs will include the increased power cost needed to operate the fan. That is, because of the longer pulse cleaning intervals, the average pressure drop across the fabric filter generally will be higher, which will require the fan to expend more energy drawing the flue gas through the system. The cost savings associated with operating the filtration system according to this example, generally will include: 1) lower overall fabric filter bag replacement cost (i.e., less frequent pulse cleanings means longer bag life); and 2) reduced sorbent cost due to the reduced sorbent injection rate. Other cost considerations, as described above, also may be taken into account.

At step 940, the process may compare the costs and the savings and, based on the comparison, make a recommendation as to whether the new operating variables are cost-effective. Thus, for example, if the additional costs exceed the savings, the process may determine that the new operating variables, i.e., the current density, the pulse cleaning interval, and/or the sorbent injection rate, that were recommended through the operation of steps 706-732, be rejected and that the settings be returned to baseline or previous values. If, on the other hand, the savings exceed the costs, the process, at step 940, may determine that the new operating variables be accepted and that the filtration system continues operating with the new settings. After step 940, the process may return to the beginning of the process, i.e., step 906, to cycle through logic flow diagram 900 again or at a predetermined time in the future.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A method of operating a filtration system that filters flue gas, which includes particulate matter and a gaseous pollutant, the filtration system including a fabric filter, which is cleaned with periodic pulse cleanings, a discharge electrode upstream of the fabric filter, which imparts an electric charge to at least some of the particulate matter before the particulate matter collects on the fabric filter, a sorbent, which is injected into the flue gas upstream of the fabric filter and absorbs at least some of the gaseous pollutant, and a fan, which draws the flue gas through the fabric filter, wherein the filtration system has a pulse cleaning interval setting that may be manipulated by an operator of the filtration system, the pulse cleaning interval setting comprising the time between the pulse cleanings, the method comprising the steps of:
   determining a cost of operating the filtration system at a first pulse cleaning interval setting;
   determining a cost of operating the filtration system at a second pulse cleaning interval setting; and
   comparing the cost of operating the filtration system at the first pulse cleaning interval setting with the cost of operating the filtration system at the second pulse cleaning interval.

2. The method according to claim 1, further comprising the step of making a recommendation to the operator based upon the comparison of the cost of operating the filtration system at the first pulse cleaning interval with the cost of operating the filtration system at the second pulse cleaning interval as to whether it is less expensive to operate the filtration system at the first pulse cleaning interval setting or the second pulse cleaning interval setting.

3. The method according to claim 1, wherein:
   determining the cost of operating the filtration system at the first pulse cleaning interval setting includes determining costs associated with at least: a) an operational life of the fabric filter at the first pulse cleaning interval setting; b) a pressure drop across the fabric filter at the first pulse cleaning interval setting and the energy needed by the fan to overcome the pressure drop to draw the flue gas through the filtration system; and c) the amount of injected sorbent needed at the first pulse cleaning interval setting to maintain a gaseous pollutant emission level below a predetermined maximum gaseous pollutant emission level; and
   determining the cost of operating the filtration system at the second pulse cleaning interval setting includes determining costs associated with: a) the operational life of the fabric filter at the second pulse cleaning interval setting; b) the pressure drop across the fabric filter at the second pulse cleaning interval setting and the energy needed to by the fan to overcome the pressure drop to draw the flue gas through the filtration system; and c) the amount of injected sorbent needed at the second pulse cleaning interval setting to maintain the gaseous pollutant emission level below the predetermined maximum level of gaseous pollutant emission level.

4. The method according to claim 1, further comprising the steps of:
   operating the filtration system at the first pulse cleaning interval setting if it is determined that the cost of operating the filtration system at the first pulse cleaning interval setting is less than the cost of operating the filtration system at the second pulse cleaning interval setting; and
   operating the filtration system at the second pulse cleaning interval setting if it is determined that the cost of operating the filtration system at the second pulse cleaning interval setting is less than the cost of operating the filtration system at the first pulse cleaning interval setting.

5. The method according to claim 1, wherein the sorbent comprises powdered activated carbon and the gaseous pollutant comprises mercury.

6. The method according to claim 1, wherein the filtration system includes a current density setting that may be manipulated by the operator, which comprises the level of current running through the discharge electrode divided by the total cloth area of the fabric filter;
   further comprising the steps of:
   determining a cost of operating the filtration system at a first current density setting;
   determining a cost of operating the filtration system at a second current density setting; and
   comparing the cost of operating the filtration system at the first current density setting with the cost of operating the filtration system at the second current density setting.

7. The method according to claim 1, wherein the filtration system comprises a sorbent injection rate setting that may be manipulated by the operator, which comprises the rate at which sorbent is injected into the flue gas;
   further comprising the steps of:
   determining a cost of operating the filtration system at a first sorbent injection rate setting;
   determining a cost of operating the filtration system at a second sorbent injection rate setting; and
   comparing the cost of operating the filtration system at the first sorbent injection rate setting with the cost of operating the filtration system at the second sorbent injection rate setting.

8. A method of operating a filtration system that filters flue gas that includes both particulate matter and a gaseous pollutant, the filtration system including a fabric filter, which is cleaned with periodic pulse cleanings, a discharge electrode upstream of the fabric filter, which imparts an electric charge to at least some of the particulate matter before the particulate matter collects on the fabric filter, a sorbent, which is injected into the flue gas upstream of the fabric filter and absorbs at least some of the gaseous pollutant, wherein the filtration system measures operating conditions, including at least a gaseous pollutant emission level, which comprises a measure of the level of the gaseous pollutant contained in the emissions of the filtration system, and wherein the filtration system includes a pulse cleaning interval setting that may be manipulated by an operator, the pulse cleaning interval setting comprising the time between pulse cleanings, the method comprising the steps of:
   a) increasing the pulse cleaning interval setting to one or more increased pulse cleaning interval settings while monitoring the gaseous pollutant emission level to determine a modified pulse cleaning interval setting, which is an approximate setting at which further increases to the pulse cleaning interval setting do not cause a reduction to the gaseous pollutant emission level; and b) operating the filtration system at the modified pulse cleaning interval setting.

9. The method according to claim 8, wherein the filtration system further includes an operator controlled sorbent injection rate setting, which comprises the rate at which sorbent is injected into the flue gas;

further including the steps of:
c) decreasing the sorbent injection rate setting to one or more decreased sorbent injection rate settings while monitoring the gaseous pollutant emission level to determine a modified sorbent injection rate setting, which is an approximate setting at which further decreases to the sorbent injection rate setting cause the gaseous pollutant emission level to exceed a predetermined maximum gaseous pollutant emission level; and
d) operating the filtration system at the modified sorbent injection rate setting.

10. The method according to claim 8, wherein the filtration system further includes an operator controlled current density setting, which comprises the level of current running through the discharge electrode divided by the total cloth area of the fabric filter;

further including the steps of:
e) increasing the current density setting to one or more increased current density settings while monitoring a pressure drop across the fabric filter to determine a modified current density setting, which is an approximate setting at which further increases to the current density setting do not cause a reduction to the pressure drop; and
f) operating the filtration system at the modified current density setting.

11. The method according to claim 8, wherein the filtration system further includes an electrostatic precipitator, which is a collection device upstream of the fabric filter and the discharge electrode that removes particulate matter from the flue gas using the force of an induced electrostatic charge, and an operator controlled inlet particulate matter loading setting, which comprises a level of particulate matter that is allowed to leave the electrostatic precipitator and proceed downstream to the fabric filter;

further including the steps of:
g) increasing the inlet particulate matter loading setting to one or more increased inlet particulate matter loading settings while monitoring the gaseous pollutant emission level to determine a modified inlet particulate matter loading setting, which is an approximate setting at which further increases to the inlet particulate matter loading setting do not cause a reduction to the gaseous pollutant emission level; and
h) operating the filtration system at the modified inlet particulate matter loading setting.

12. The method according to claim 8, wherein the filtration system further includes an operator controlled sorbent injection rate setting, which comprises the rate at which sorbent is injected into the flue gas, and an operator controlled current density setting, which comprises the level of current running through the discharge electrode divided by the total cloth area of the fabric filter;

further including the steps of:
c) decreasing the sorbent injection rate setting to one or more decreased sorbent injection rate settings while monitoring the gaseous pollutant emission level to determine a modified sorbent injection rate setting, which is an approximate setting at which further decreases to the sorbent injection rate setting cause the gaseous pollutant emission level to exceed a predetermined maximum gaseous pollutant emission level; and
d) operating the filtration system at the modified sorbent injection rate setting;
e) increasing the current density setting to one or more increased current density settings while monitoring a pressure drop across the fabric filter to determine a modified current density setting, which is an approximate setting at which further increases to the current density setting do not cause a reduction to the pressure drop; and
f) operating the filtration system at the modified current density setting.

13. The method according to claim 12, wherein the filtration system further includes an electrostatic precipitator, which is a collection device upstream of the fabric filter and the discharge electrode that removes particulate matter from the flue gas using the force of an induced electrostatic charge, and an operator controlled inlet particulate matter loading setting, which comprises a level of particulate matter that is allowed to leave the electrostatic precipitator and proceed downstream to the fabric filter;

further including the steps of:
g) increasing the inlet particulate matter loading setting to one or more increased inlet particulate matter loading settings while monitoring the gaseous pollutant emission level to determine a modified inlet particulate matter loading setting, which is an approximate setting at which further increases to the inlet particulate matter loading setting do not cause a reduction to the gaseous pollutant emission level; and
h) operating the filtration system at the modified inlet particulate matter loading setting.

14. The method according to claim 12, wherein the steps are performed in the following order: step e; followed by step f; followed by step a; followed by step b; followed by step c; followed by step d.

15. The method according to claim 13, wherein the steps are performed in the following order: step e; followed by step f; followed by step a; followed by step b; followed by step g; followed by step h; followed by step c; followed by step d.

16. The method according to claim 13, wherein the completion of steps a and b include the steps of:

first, increasing the pulse cleaning interval setting from a first pulse cleaning interval setting to an increased pulse cleaning interval setting;

second, determining whether the increased pulse cleaning interval setting causes a reduction to the gaseous pollutant emission level;

third, if it is determined that the increased pulse cleaning interval setting causes a decrease in the gaseous pollutant emission level, repeating the first and second steps in this claim until an increase to the pulse cleaning interval setting does not cause a decrease in the gaseous pollutant emission level; and fourth, operating the filtration system at the last pulse cleaning interval setting that caused a decrease in the gaseous pollutant emission level or, if none, the first pulse cleaning interval setting.

17. The method according to claim 16, wherein the completion of steps c and d include the steps of:

first, decreasing the sorbent injection rate setting from a first sorbent injection rate setting to a decreased sorbent injection rate setting;

second, determining whether the decreased sorbent injection rate setting causes the gaseous pollutant emission level to exceed a predetermined maximum gaseous pollutant emission level;

third, if it is determined that the decreased sorbent injection rate setting does not cause the gaseous pollutant emission level to exceed the predetermined maximum gaseous pollutant emission level, repeating the first and second steps in this claim until a decrease to the sorbent injection rate setting causes the gaseous pollutant emission level to exceed the predetermined maximum gaseous pollutant emission level; and fourth, operating the filtration system at the last sorbent injection rate setting that did not cause the gaseous pollutant emission level to exceed the predetermined maximum gaseous pollutant emission level or, if none, the first sorbent injection rate setting.

18. The method according to claim 17, wherein the completion of steps e and f include the steps of:

first, increasing the current density setting from a first current density setting to an increased current density setting;

second, determining whether the increased current density setting causes a decrease in a pressure drop across the fabric filter;

third, if it is determined that the increased current density setting causes a decrease in the pressure drop, repeating the first and second steps in this claim until an increase to the current density setting does not cause a decrease in the pressure drop; and fourth, operating the filtration system at the last current density setting that caused a decrease in the pressure drop or, if none, the first current density setting.

19. The method according to claim 18, wherein the steps are performed in the following order: step e; followed by step f; followed by step a; followed by step b; followed by step c; followed by step d.

20. The method according to claim 18, wherein the completion of steps g and h include the steps of:

first, increasing the inlet particulate matter loading setting from a first inlet particulate matter loading setting to an increased inlet particulate matter loading setting;

second, determining whether the increased inlet particulate matter loading setting causes a reduction to the gaseous pollutant emission level;

third, if it is determined that the increased inlet particulate matter loading setting causes a decrease in the gaseous pollutant emission level, repeating the first and second steps in this claim until an increase to the inlet particulate matter loading setting does not cause a decrease in the gaseous pollutant emission level; and fourth, operating the filtration system at the last inlet particulate matter loading setting that caused a decrease in the gaseous pollutant emission level or, if none, the first inlet particulate matter loading setting.

21. The method according to claim 20, wherein the steps are performed in the following order: step e; followed by step f; followed by step a; followed by step b; followed by step g; followed by step h; followed by step c; followed by step d.

22. The method according to claim 8, wherein the sorbent comprises powdered activated carbon and the gaseous pollutant comprises mercury.

23. The method according to claim 8, wherein the filtration system also measures other operating conditions, including at least a pressure drop, which comprises the pressure drop across the fabric filter, and a particulate matter emission level, which comprises the level of particulate matter in the emissions of the filtration system, further comprising at least two of the following steps:

determining whether the gaseous pollutant emission exceeds a predetermined maximum gaseous pollutant emission level;

determining whether the pressure drop exceeds a predetermined maximum pressure drop; and determining whether the particulate matter emission level exceeds a predetermined maximum particulate matter emission level.

24. A method of operating a filtration system that filters flue gas, the flue gas including particulate matter and a gaseous pollutant, the filtration system including a fabric filter, which is cleaned with periodic pulse cleanings, a discharge electrode upstream of the fabric filter, which imparts an electric charge to at least some of the particulate matter before the particulate matter collects on the fabric filter, and a sorbent, which is injected into the flue gas upstream of the fabric filter and absorbs at least some of the gaseous pollutant, wherein the filtration system measures certain operating conditions during operation, including at least a gaseous pollutant emission level, which comprises the level of the gaseous pollutant in the emissions of the filtration system, and a pressure drop, which comprises the pressure drop across the fabric filter, and wherein the filtration system has several operational settings that may be manipulated by an operator of the filtration system, including a current density setting, which comprises the current running through the discharge electrode divided by the total cloth area of the filter fabric, a pulse cleaning interval setting, which comprises the time between pulse cleanings, and a sorbent injection rate setting, which comprises the rate at which the sorbent is injected into the flue gas, the method comprising the steps of:

a) increasing the current density setting from a first current density setting to an increased current density setting;

b) determining whether the increased current density setting causes a decrease in the pressure drop;

c) if it is determined that the increased current density setting causes a decrease in the pressure drop, repeating steps a and b until an increase to the current density setting does not cause a decrease in the pressure drop;

d) operating the filtration system at the last current density setting that caused a decrease in the pressure drop or, if none, the first current density setting;

e) increasing the pulse cleaning interval setting from a first pulse cleaning interval setting to an increased pulse cleaning interval setting;

f) determining whether the increased pulse cleaning interval setting causes a reduction to the gaseous pollutant emission level;

g) if it is determined that the increased pulse cleaning interval setting causes a decrease in the gaseous pollutant emission level, repeating steps e and f until an increase to the pulse cleaning interval setting does not cause a decrease in the gaseous pollutant emission level;

h) operating the filtration system at the last pulse cleaning interval setting that caused a decrease in the gaseous pollutant emission level or, if none, the first pulse cleaning interval setting;

i) decreasing the sorbent injection rate setting from a first sorbent injection rate setting to a decreased sorbent injection rate setting;

j) determining whether the decreased sorbent injection rate setting causes the gaseous pollutant emission level to exceed a predetermined maximum gaseous pollutant emission level;

k) if it is determined that the decreased sorbent injection rate setting does not cause the gaseous pollutant emission level to exceed a predetermined maximum gaseous pollutant emission level, repeating steps i and j until a decrease to the sorbent injection rate setting causes the gaseous pollutant emission level to exceed the predetermined maximum gaseous pollutant emission level; and l) operating the filtration system at the last sorbent injection rate setting that did not cause the gaseous pollutant emission level to exceed the predetermined maximum gaseous pollutant emission level or, if none, the first sorbent injection rate setting.

25. The method according to claim 24, wherein steps a through l are performed in order.

26. The method according to claim 24, wherein further comprising the following steps:

m) increasing an inlet particulate matter loading setting from a first inlet particulate matter loading setting to an increased inlet particulate matter loading setting;

n) determining whether the increased inlet particulate matter loading setting causes a reduction to the gaseous pollutant emission level;

o) if it is determined that the increased inlet particulate matter loading setting causes a decrease in the gaseous pollutant emission level, repeating steps m and n until an increase to the inlet particulate matter loading setting does not cause a decrease in the gaseous pollutant emission level; and p) operating the filtration system at the last inlet particulate matter loading setting that caused a decrease in the gaseous pollutant emission level or, if none, the first inlet particulate matter loading setting.

27. The method according to claim 26, wherein the steps are performed in the following order: step a; followed by step b; followed by step c; followed by step d; followed by step e; followed by step f; followed by step g; followed by step h; followed by step m; followed by step n; followed by step o; followed by step p; followed by step i; followed by step j; followed by step k; followed by step l.

28. The method according to claim 25, further comprising the steps of:

after the method has completed steps a through l, calculating a first cost of operating the filtration system based on the settings for the current density setting, the pulse cleaning interval setting, and the sorbent injection rate setting before the method completed steps a through l and calculating a second cost of operating the filtration system based on the settings for the current density setting, the pulse cleaning interval setting, and the sorbent injection rate setting after the method completed steps a through l; and comparing the first cost of operating the filtration system with the second cost of operating the filtration system.

29. The method according to claim 27, further comprising the steps of:

after the method has completed steps a through p, calculating a first cost of operating the filtration system based on the settings for the current density setting, the pulse cleaning interval setting, the inlet particulate matter loading setting; and the sorbent injection rate setting before the method completed steps a through p and calculating a second cost of operating the filtration system based on the settings for the current density setting, the pulse cleaning interval setting, the inlet particulate matter loading setting, and the sorbent injection rate setting after the method completed steps a through p; and comparing the first cost of operating the filtration system with the second cost of operating the filtration system.

30. The method according to claim 27, further comprising the steps of:

after the method has completed steps a through p, calculating a first cost of operating the filtration system based on the settings for the current density setting, the pulse cleaning interval setting, the inlet particulate matter loading setting; and the sorbent injection rate setting before the method completed steps a through p and calculating a second cost of operating the filtration system based on the settings for the current density setting, the pulse cleaning interval setting, the inlet particulate matter loading setting, and the sorbent injection rate setting after the method completed steps a through p; and comparing the first cost of operating the filtration system with the second cost of operating the filtration system.

31. The method according to claim 28, further comprising the step of operating the filtration system at at least one of settings associated with the first cost if the first cost is less than the second cost and at at least one of the settings associated with the second cost if the second cost is less than the first cost.

32. The method according to claim 28, wherein calculating the cost of operating the filtration system at the settings associated with the first cost and the settings associated with the second cost include at least two of the following steps:

a cost associated with how an increase or decrease in the pulse cleaning interval settings affects the operational life of the fabric filter;

a cost associated with how an increase or decrease in the current density setting affects the power needed to operate the discharge electrode;

a cost associated with how an increase or decrease in the current density setting affects the power needed to operate a fan that is used to draw the flue gas through the filtration system;

a cost associated with how an increase or decrease in the pulse cleaning interval settings affects the power needed to operate a fan that is used to draw the flue gas through the filtration system; and a cost associated with how an increase or decrease in the sorbent injection rate settings affects the cost associated with injecting sorbent into the flue gas.

* * * * *